(12) United States Patent
Li et al.

(10) Patent No.: US 11,367,296 B2
(45) Date of Patent: Jun. 21, 2022

(54) LAYOUT ANALYSIS

(71) Applicant: NEXTVPU (SHANGHAI) CO., LTD., Shanghai (CN)

(72) Inventors: Linfeng Li, Shanghai (CN); Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/351,080

(22) Filed: Jun. 17, 2021

(65) Prior Publication Data

US 2022/0012482 A1  Jan. 13, 2022

Related U.S. Application Data

(63) Continuation of application No. PCT/CN2021/092338, filed on May 8, 2021.

(30) Foreign Application Priority Data

Jul. 13, 2020 (CN) .......................... 202010667074.6

(51) Int. Cl.
*G06V 40/00* (2022.01)
*G06V 30/412* (2022.01)
(Continued)

(52) U.S. Cl.
CPC .......... *G06V 30/412* (2022.01); *G06F 40/106* (2020.01); *G06F 40/174* (2020.01);
(Continued)

(58) Field of Classification Search
CPC .... G06K 9/00442–00483; G06K 2009/00489; G06T 7/11; G06V 30/40–43; G06V 2201/131
See application file for complete search history.

(56) References Cited

U.S. PATENT DOCUMENTS 5,689,342 A * 11/1997 Nakatsuka ......... G06K 9/00442
358/296
5,848,184 A * 12/1998 Taylor ................ G06K 9/00463
382/173

(Continued)

FOREIGN PATENT DOCUMENTS

CN  102479173 A  5/2012
CN  104516891 A  4/2015
(Continued)

OTHER PUBLICATIONS

Chang, et al., "Chinese Document Layout Analysis Using an Adaptive Regrouping Strategy", The Journal of the Pattern Recognition Society, Pattern Recognition 38, 2005, pp. 261-271.
(Continued)

*Primary Examiner* — Sean T Motsinger
(74) *Attorney, Agent, or Firm* — Kilpatrick Townsend & Stockton LLP

(57) ABSTRACT

A layout analysis method, an electronic device, and a non-transitory computer-readable storage medium are provided. The layout analysis method includes: obtaining coordinate information of a plurality of text lines in an image; creating a layout model of the image according to the coordinate information; analyzing a layout structure of the text lines based on the layout model; and determining an order of the text lines relative to each other based on the layout structure.

18 Claims, 24 Drawing Sheets

(51) Int. Cl.
| | |
|---|---|
| *G06F 40/174* | (2020.01) |
| *G06F 40/106* | (2020.01) |
| *G06T 7/11* | (2017.01) |
| *G06V 30/414* | (2022.01) |
| *G06V 30/416* | (2022.01) |
| *G06V 30/418* | (2022.01) |

(52) U.S. Cl.
CPC .............. *G06T 7/11* (2017.01); *G06V 30/414* (2022.01); *G06V 30/416* (2022.01); *G06V 30/418* (2022.01); *G06V 2201/131* (2022.01)

(56) References Cited

U.S. PATENT DOCUMENTS

| | | | | |
|---|---|---|---|---|
| 2007/0081179 | A1* | 4/2007 | Nishida | G06K 9/00469 358/1.11 |
| 2010/0174732 | A1* | 7/2010 | Levy | G06F 40/205 707/768 |
| 2010/0211871 | A1* | 8/2010 | Kubota | G06F 40/174 715/247 |
| 2011/0026827 | A1* | 2/2011 | Sato | G06K 9/00463 382/176 |
| 2011/0173532 | A1* | 7/2011 | Forman | G06F 40/103 715/256 |
| 2011/0222771 | A1* | 9/2011 | Cimpoi | G06K 9/18 382/176 |
| 2011/0222773 | A1* | 9/2011 | Radakovic | G06K 9/00469 382/182 |
| 2013/0191732 | A1* | 7/2013 | Lazarevic | G06K 9/00463 715/249 |
| 2013/0235087 | A1* | 9/2013 | Kashibuchi | G06T 7/60 345/660 |
| 2013/0243263 | A1* | 9/2013 | Ishihara | G06K 9/00442 382/112 |
| 2013/0329263 | A1* | 12/2013 | Enomoto | H04N 1/40 358/470 |
| 2014/0257789 | A1* | 9/2014 | Zaric | G06F 40/263 704/8 |
| 2015/0212654 | A1 | 7/2015 | Beckett | |
| 2019/0188466 | A1* | 6/2019 | Marr | G06K 9/00463 |
| 2019/0266394 | A1* | 8/2019 | Yu | G06K 9/00449 |
| 2020/0175267 | A1* | 6/2020 | Schafer | G06K 9/4628 |
| 2021/0012102 | A1* | 1/2021 | Cristescu | G06F 16/56 |
| 2021/0073552 | A1* | 3/2021 | Matsuo | G06K 9/00671 |
| 2021/0110151 | A1* | 4/2021 | Tagra | G06K 9/00469 |
| 2021/0133439 | A1* | 5/2021 | Mehra | G06N 3/08 |

FOREIGN PATENT DOCUMENTS

| | | |
|---|---|---|
| CN | 109934210 A | 6/2019 |
| CN | 110969056 A | 4/2020 |
| CN | 111046784 A | 4/2020 |
| CN | 111340037 A | 6/2020 |
| CN | 111832476 A | 10/2020 |
| JP | H05342326 A | 12/1993 |
| JP | 06215184 A | 8/1994 |
| JP | 08147410 A | 6/1996 |
| JP | 11250041 A | 9/1999 |
| JP | 2004240643 A | 8/2004 |
| JP | 2004272822 A | 9/2004 |
| JP | 2013101616 A | 5/2013 |
| JP | 2013182567 A | 9/2013 |
| JP | 2018060389 A | 4/2018 |
| JP | 2020191056 A | 11/2020 |
| KR | 20110087620 A | 8/2011 |
| KR | 101484419 B1 | 1/2015 |
| KR | 101811581 B1 | 12/2017 |

OTHER PUBLICATIONS

Chen, et al., "Extraction of Text Layout Structures on Document Images Based on Statistical Characterization", SPIE, vol. 2422, XP 000642545, 1995, pp. 128-139.

Lee, et al., "Parameter-Free Geometric Document Layout Analysis", IEEE Transactions on Pattern Analysis and Machine Intelligence, vol. 23, No. 11, 2001, pp. 1240-1256.

Spitz, "Text Characterization by Connected Component Transformations", SPIE, vol. 2181 Document Recognition, XP 000642508, 1994, pp. 97-105.

Xi, et al., "Page Segmentation of Chinese Newspapers", The Journal of the Pattern Recognition Society, Pattern Recognition 35, 2002, pp. 2695-2704.

* cited by examiner

LAYOUT ANALYSIS

CROSS-REFERENCES TO RELATED APPLICATIONS

This application claims priority to and is a continuation application of International Application No. PCT/CN2021/092338, filed on May 8, 2021, which claims priority to Chinese Patent Application No. 202010667074.6, filed on Jul. 13, 2020. The entire content of each of the aforementioned applications is incorporated herein by reference for all purposes.

TECHNICAL FIELD

The present disclosure relates to the field of data processing, and in particular, to a layout analysis method, an electronic device, and a non-transitory computer-readable storage medium.

BACKGROUND OF THE INVENTION

There is a technology for layout analysis of images in related technologies. The technology uses image processing, artificial intelligence, and other technologies to classify and recognize text fields in image files of printed matter to facilitate subsequent applications such as the generation of e-books and the generation of audio books. Known technologies are usually used to perform layout analysis based on an original image of the printed matter, resulting in a slow processing speed.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

BRIEF SUMMARY OF THE INVENTION

According to some embodiments of the present disclosure, a layout analysis method is provided, including: obtaining coordinate information of a plurality of text lines in an image; creating a layout model of the image according to the coordinate information; analyzing a layout structure of the text lines based on the layout model; and determining an order of the text lines relative to each other based on the layout structure.

According to some embodiments of the present disclosure, an electronic device is provided, including: a processor; and a memory storing a program, wherein the program includes instructions that, when executed by the processor, cause the processor to perform a method according to the present disclosure.

According to some embodiments of the present disclosure, a non-transitory computer-readable storage medium storing a program is provided, wherein the program includes instructions that, when executed by a processor of an electronic device, cause the electronic device to perform a method according to the present disclosure.

These and other aspects of the present disclosure will be clear from the embodiments described below, and will be clarified with reference to the embodiments described below.

BRIEF DESCRIPTION OF THE DRAWINGS

The drawings exemplarily show embodiments and form a part of the specification, and are used to explain exemplary implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION OF THE INVENTION

Figure 1:
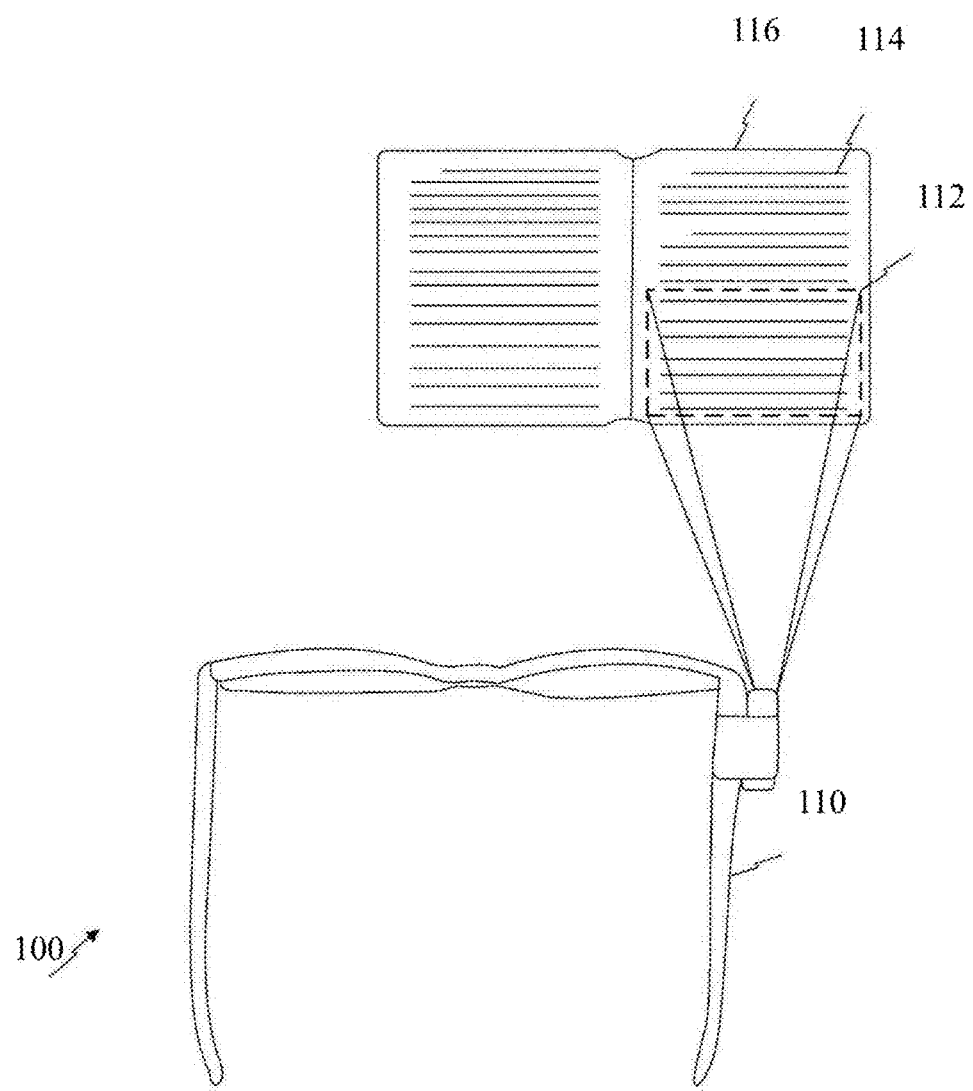
FIG. 1 is a schematic diagram showing an exemplary application scenario in which various methods described herein can be applied according to an exemplary embodiment.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. The term "based on" means "at least partly based on". Moreover, the term "and/or" used in the present disclosure encompasses any of and all possible combinations of listed items.

In the present disclosure, the spatial relative terms "horizontal" and "vertical" are used in combination with a layout model. In such a context, the "horizontal direction" refers to the line direction of the layout model, and the "vertical direction" refers to the column direction of the layout model. In addition, the spatial relative terms "upper", "lower", "left", and "right" are also used in combination with the layout model. "Upper", "lower", "left", and "right" indicate, when reading matter (e.g., a book or magazine) is correctly oriented for reading relative to a reader, the orientation on an image (or equivalently, the layout model of the image) of the reading matter observed from an angle of view of an image sensor (e.g., worn or held by the reader). Therefore, the "up-down direction" substantially corresponds to the column direction of the layout model, and the "left-right direction" substantially corresponds to the line direction of the layout model.

The following description of the present disclosure is mainly based on the case where text lines extend in a substantially left-right direction relative to the reader (i.e., in horizontal layout reading matter), but the technical solution of the present disclosure is not limited thereto. The technical solution of the present disclosure is also applicable to the case where the text lines extend in a substantially up-down direction relative to the reader (i.e., in vertical layout reading matter), i.e., the method of the present disclosure is also applicable to the vertical layout reading matter. In the case of a horizontal layout, text lines are a text sequence extending in the substantially left-right direction (horizontal direction), while in the case of a vertical layout, the text lines are a text sequence extending in the substantially up-down direction (vertical direction).

When reading a book, a magazine, or other reading matter, a person with normal vision captures an image within a visual field through vision, recognizes a text region in the image through the brain, and reads text in the text region in a reading order. However, for the visually impaired, it may be necessary to rely on a reading assisting device to recognize and broadcast the text in the reading matter. In this case, the reading assisting device not only needs to recognize the text in the image, but also needs to use a certain algorithm to determine the order of the text lines in the text region so as to be capable of "reading" the text in the reading matter in a correct reading order.

FIG. 1 is a schematic diagram showing an exemplary application scenario 100 in which various methods described herein can be applied according to an exemplary embodiment. As shown in FIG. 1, the exemplary scenario 100 may include, but is not limited to, applications such as reading assistance for the visually impaired and intelligent reading aloud. A reading assisting device such as smart glasses 110 is provided with a text recognition apparatus, and a text region of reading matter 116 containing one or more text lines 114 is photographed by the text recognition apparatus. The text recognition apparatus recognizes and broadcasts text in its photographing range 112 through its built-in chip and algorithm.

Figure 2:
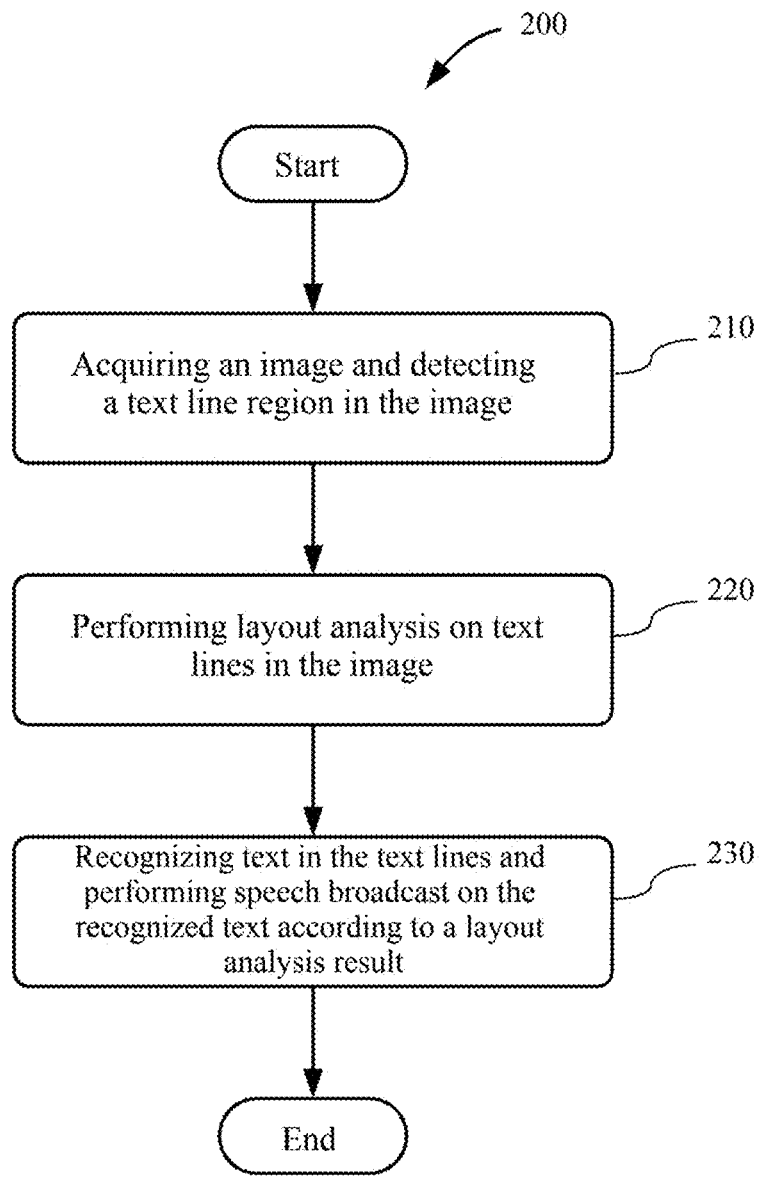
FIG. 2 is a flow chart showing an exemplary method that can be used in the application scenario of FIG. 1 to recognize text in an image and perform speech broadcast of the recognized text.

FIG. 2 is a flow chart showing an exemplary method 200 that can be used in the application scenario 100 to recognize text in an image and perform speech broadcast of the recognized text. As shown in FIG. 2, the method 200 includes the following steps: collecting an image and detecting a text line region in the image (step 210); performing layout analysis on text lines in the image (step 220); and recognizing text in the text lines and performing speech broadcast of the recognized text according to a result of the layout analysis (step 230). The detection of the text region (step 210) and the recognition of the text (step 230) can be implemented by using various methods, including, e.g., a conventional image processing algorithm (such as MSER) and/or a deep learning method.

In order to further clarify the subject of the present disclosure, the following describes in detail how to perform layout analysis on the text lines in the image (step 220). It will be appreciated that the application scenario 100 and the method 200 described above with respect to FIGS. 1 and 2 are only exemplary, which means that the layout analysis method according to the embodiment of the present disclosure is not limited to the application described above.

Figure 3:
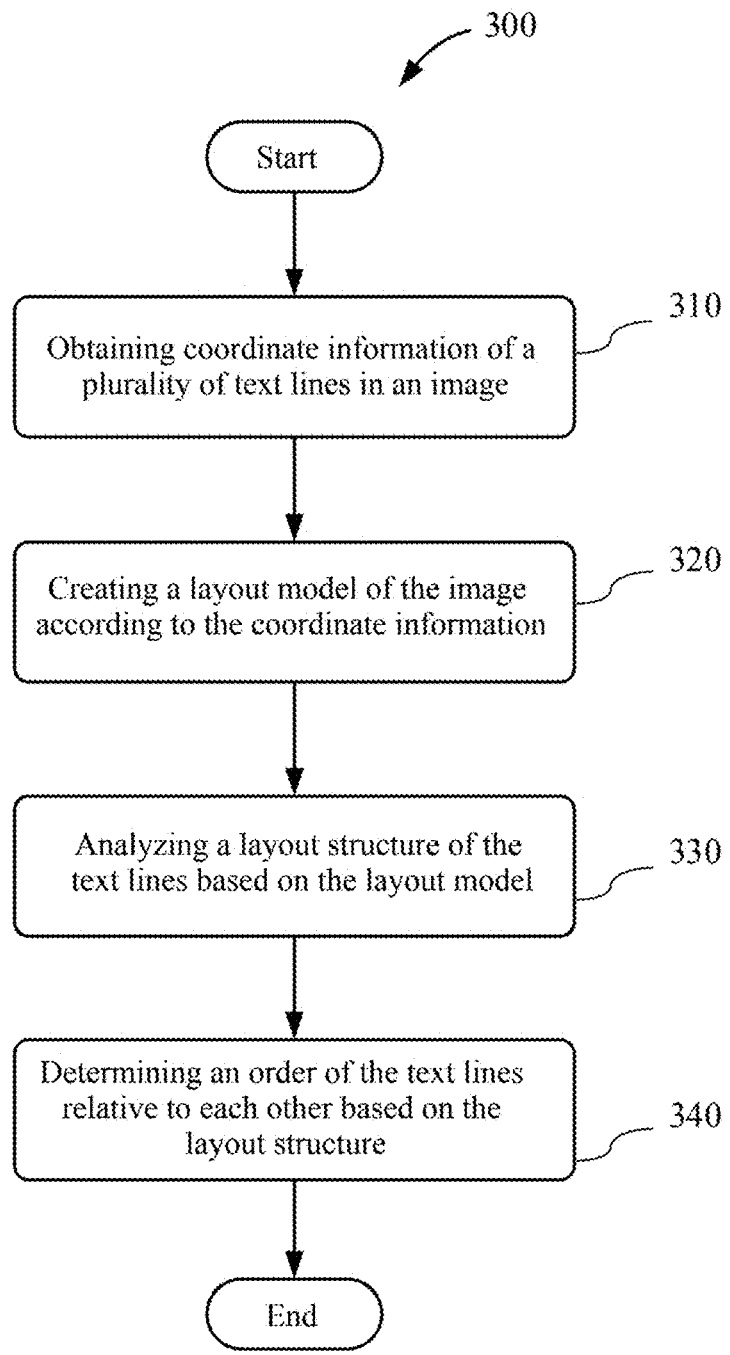
FIG. 3 is a flow chart showing a layout analysis method according to an exemplary embodiment.

FIG. 3 is a flow chart showing a layout analysis method 300 according to an exemplary embodiment of the present disclosure. The layout analysis method 300 may be used to implement step 220 in FIG. 2. As shown in FIG. 3, the layout analysis method 300 includes the following steps: obtaining coordinate information of a plurality of text lines in an image (step 310), creating a layout model of the image according to the coordinate information (step 320), analyzing a layout structure of the text lines based on the layout model (step 330), and determining an order of the text lines relative to each other based on the layout structure (step 340).

As will be clearer from the following description, the layout analysis method 300 is not operated on the basis of an original image, and does not require semantic analysis. Instead, the method is used to convert an image region containing text into a layout model that simulates text distribution in the image but has a simpler structure, and further perform spatial layout analysis on data in the layout model.

In step 310, the coordinate information of the plurality of text lines in the image is obtained.

Since the exemplary method of the present disclosure is used to perform layout analysis mainly based on coordinate information of text rather than an original image itself of the text, in this step, the coordinate information of the plurality of text lines in the image is obtained for subsequent processing. The image may be an electronic image data acquired by an image sensor. According to some embodiments, the image sensor may be disposed on a user's wearable device, glasses, or other items, for example, in the application scenario 100 shown in FIG. 1.

Figure 4:
FIG. 4 is a schematic diagram showing an image including a text region according to an exemplary embodiment.

FIG. 4 is a schematic diagram showing an image 400 including a text region according to an exemplary embodiment. As shown in FIG. 4, the image 400 may include text (which may include text, numbers, characters, punctuation marks, etc. of various countries and regions), pictures, etc., wherein text lines 410 containing text are shown. According to some embodiments, the image 400 may be a preprocessed image, wherein the preprocessing may include, but is not limited to, color correction, blur removal, etc.

As described above, the text region can be detected by using various methods, such as an image processing algorithm (such as MSER) or a deep learning method. Through the detection of the text region in the image 400, the coordinate information of each text line in the image 400 may be obtained. The coordinate information of the text line may be obtained, for example, from other machines (such as a remote server or a cloud computing device), or may be obtained through a local detection algorithm. According to some embodiments, the obtained coordinate information of the text line may be stored in a local storage device or storage medium for subsequent use. As used herein, the term text line refers to a continuous line of text, which may be, for example, a sequence of text having an adjacent text spacing less than a threshold spacing in the left-right direction, or a sequence of text having an adjacent text spacing less than a threshold spacing in the up-down direction.

According to some embodiments, the coordinate information of one text line may be coordinate information of a rectangle containing the text line (e.g., a minimum circumscribed rectangle containing the text line, or a rectangle obtained by expanding the minimum circumscribed rectangle containing the text line upwards, and/or downwards, and/or leftwards, and/or rightwards by a certain multiple). The coordinate information of the text line may include, for example, coordinate information of four vertices of the rectangle, or may include coordinate information of any vertex of the rectangle and height information and length information of the rectangle. However, the definition of the coordinate information of the text line is not limited thereto, as long as it can represent the position and size of a space occupied by the text line.

Referring back to FIG. 3, in step 320, the layout model of the image is created according to the coordinate information. As used herein, the term "layout model" refers to a data structure that is obtained through conversion of an image containing text and that simulates text distribution in the image but has a simpler structure.

According to some embodiments, the layout model is obtained by filling data elements corresponding to the obtained coordinate information in the data structure with data values. The data structure may include a plurality of data elements, the data elements filled with the data values form a plurality of rectangular blocks, and the plurality of rectangular blocks correspond to respective text lines in the plurality of text lines.

According to some embodiments, the data structure may be a file in a memory (e.g., an internal memory and a cache), or an image expressed in pixels, or a table or a data array. The data structure is not limited to any specific data structure, as long as the data therein can simulate the text lines in the image. The data structure may have the same size as that of the image, or have a size proportionally scaled relative to the size of the image. For example, if the image has a pixel size of 3840×2160, the data structure (and the corresponding layout model) may have the same size as the image (i.e., have 3840×2160 matrix elements). Alternatively, the data structure may be scaled only in the horizontal direction (for example, with 1920×2160 matrix elements), or may be scaled only in the vertical direction (for example, with 3840×1080 matrix elements), or may be scaled in both the horizontal direction and the vertical direction (for example, with 1920×1080 matrix elements, or with 1280×1080 matrix elements), etc. Regardless of the case of the data structure having the same size as that of the image or having a size proportionally scaled relative to the size of the image, a correspondence or a mapping relationship can be established between the data elements in the data structure and pixels in the image.

Figure 5:
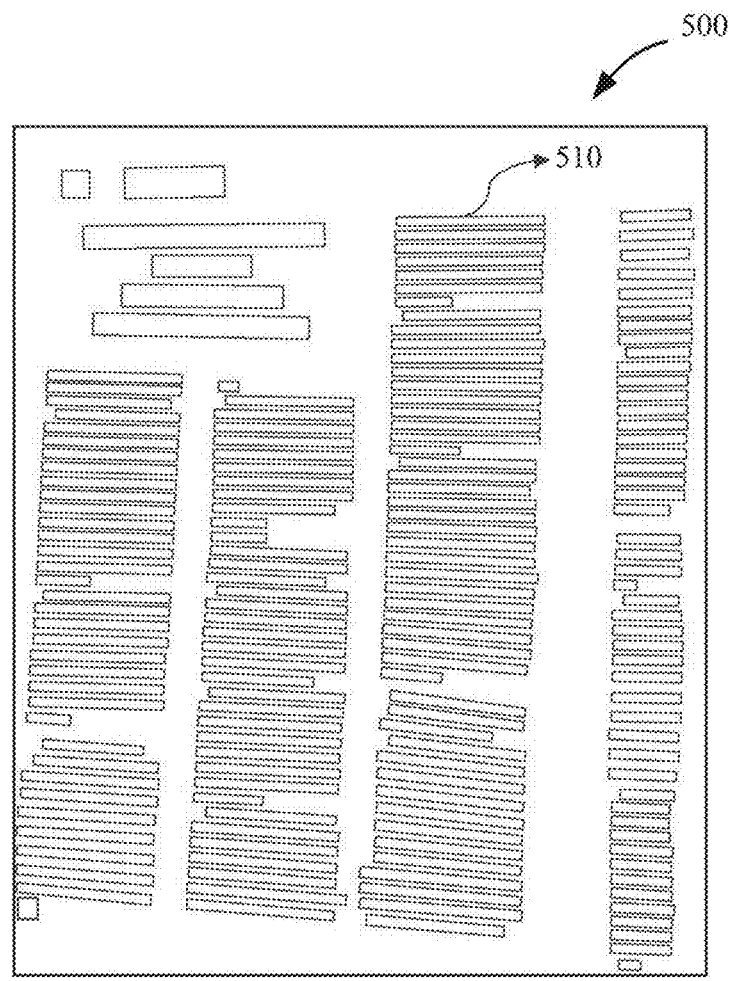
FIG. 5 is a schematic diagram showing a layout model created for the image shown in FIG. 4 according to an exemplary embodiment.

FIG. 5 is a schematic diagram showing a layout model 500 created for the image 400 shown in FIG. 4 according to an exemplary embodiment. As shown in FIG. 5, the data structure is filled with a corresponding data value such that the data element filled with the data value forms a rectangular block 510 corresponding to the text line 410 in FIG. 4. In this example, the size of the layout model 500 is the same as the size of the image 400.

The rectangular block formed by the data element filled with the data value indicates that text exists in a corresponding image region of the rectangular block, which has nothing to do with the meaning or content of the text. According to some embodiments, the data structure may include a two-dimensional matrix, e.g., a two-dimensional blank matrix. The two-dimensional blank matrix refers to a two-dimensional matrix having matrix elements with data values all being "0" by default. When the layout model 500 of the image 400 is created, a matrix element of the two-dimensional matrix corresponding to coordinate information of a text line in the image 400 may be filled with the data value "1". However, the data value is not limited to this, as long as it can be distinguished whether text or a text line exists in the region. For example, for a data structure using 8-bit data elements, a data element corresponding to coordinate information of a text line in the image 400 may be filled with the data value "255".

Referring back to FIG. 3, in step 330, the layout structure of the text lines is analyzed based on the layout model. The layout structure of the text lines is analyzed based on the layout model without performing an operation on the original image. Therefore, the layout structure of the text line can be analyzed quickly, and the efficiency of the layout analysis is improved.

Figure 6:
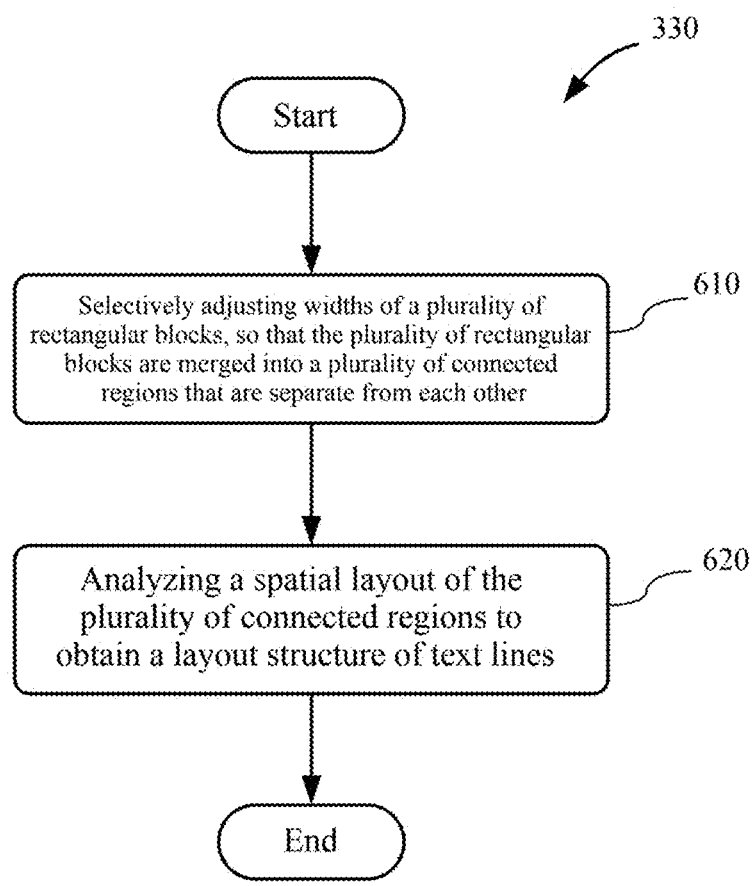
FIG. 6 is a flow chart showing a method for analyzing a layout structure of text lines according to an exemplary embodiment.

FIG. 6 is a flow chart showing a process for implementing step 330 according to an exemplary embodiment. As shown in FIG. 6, the process includes: selectively adjusting widths of a plurality of rectangular blocks (step 610); and analyzing a spatial layout of a plurality of connected regions (step 620).

In step 610, the widths of the plurality of rectangular blocks are selectively adjusted, so that the plurality of rectangular blocks are merged into a plurality of connected regions that are separate from each other.

Figure 7:
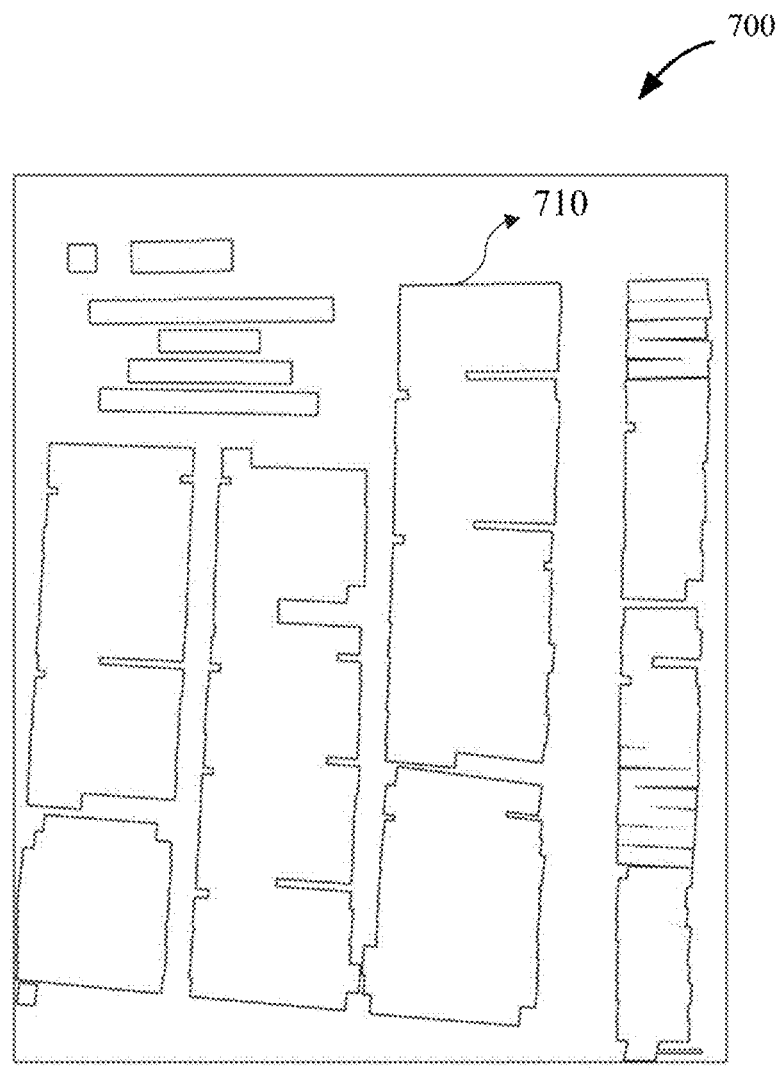
FIG. 7 is a schematic diagram showing a layout model obtained by adjusting widths of rectangular blocks in FIG. 5 to form a plurality of connected regions according to an exemplary embodiment.

FIG. 7 is a schematic diagram showing a layout model 700 obtained by adjusting widths of rectangular blocks 510 in FIG. 5 to form a plurality of connected regions 710 according to an exemplary embodiment. The obtained plurality of connected regions 710 correspond to a plurality of paragraphs of the text lines. Therefore, the operation of step 610 may be referred to as paragraph division.

According to some embodiments, the widths of the plurality of rectangular blocks are selectively adjusted. If the width of each of the rectangular blocks is less than or equal to a representative width of the plurality of rectangular blocks, the width of the rectangular block is increased by a first amount. If the width of the rectangular block is greater than the representative width and less than or equal to a first number of times of the representative width, the width of the rectangular block is increased by a second amount. If the width of the rectangular block is greater than the first number of times of the representative width and less than or equal to a second number of times of the representative width, the width of the rectangular block is not adjusted. If the width of the rectangular block is greater than the second number of times of the representative width, the width of the rectangular block is decreased by a third amount.

According to some embodiments, in the step of selectively adjusting the widths of the plurality of rectangular blocks, the representative width may be an average width of a subset of the plurality of rectangular blocks, and the subset of the plurality of rectangular blocks is composed of rectangular blocks in the plurality of rectangular blocks other than those having a width greater than a threshold width percentile. In such an embodiment, among the plurality of rectangular blocks of the layout model, the rectangular blocks with a greater width (the font in the corresponding text line is greater, for example, in a header line) are filtered out first, and then the average width of the remaining rectangular blocks is calculated as the representative width. The rectangular blocks having a width greater than the threshold width percentile are not involved in the calculation of the average width, instead of being removed. For example, the threshold width percentile may be set to 90%, 95%, etc., and the specific value may be specifically set for the threshold width percentile according to actual applications, which is not limited herein. This can prevent a rectangular block with a too large width from affecting the accuracy of paragraph division, for example, merging a paragraph that should have been divided into two paragraphs into a single paragraph.

It will be appreciated that, in this context, in the case where a text line extends in a substantially left-right direction relative to a reader (i.e., in horizontal layout reading matter), the length direction of the rectangular block corresponding to the text line is the substantially left-right extending direction, and the width direction of the rectangular block is the direction that is substantially perpendicular to the substantially left-right extending direction (i.e., a substantially up-down extending direction); and in the case where a text line extends in a substantially up-down direction relative to a reader (i.e., in vertical layout reading matter), the length direction of the rectangular block corresponding to the text line is a substantially up-down extending direction, and the width direction of the rectangular block is a direction substantially perpendicular to the substantially up-down extending direction (i.e., a substantially left-right extending direction). Therefore, in the case where the text line extends in the substantially left-right direction relative to the reader (i.e., in horizontal layout reading matter), the representative width is the height of the font in the up-down direction (i.e., a line height); and in the case where the text line extends in the substantially up-down direction relative to the reader (i.e., in vertical layout reading matter), the representative width is the height of the font in the left-right direction (i.e., a column width).

According to some embodiments, the representative width may alternatively be the average width of the above plurality of rectangular blocks. This can simplify the calculation amount of paragraph division, and may be applicable in some cases (for example, in the case where the size of a header text line is close to the size of the body text line).

According to some embodiments, the first amount may include 0.5 time. The width of the rectangular block is increased by 0.5 time the width of the rectangular block at both ends in the width direction. In some embodiments, coordinates of four vertices of the rectangular block are each increased or decreased by a value of 0.5 time the width of the rectangular block in the width direction. It should be understood that the specific value of the first amount may be set according to actual applications, which is not limited herein.

According to some embodiments, the first number of times may include 1.5 times. Increasing the width of the rectangular block by the second amount includes: increasing the width of the rectangular block by 0.5 time the representative width at both ends in the width direction. It should be understood that the specific values of the first number of times and the second amount may be set according to actual applications, which is not limited herein.

According to some embodiments, the second number of times may include 2 times. Decreasing the width of the rectangular block by a third amount includes: decreasing the width of the rectangular block by 0.5 time the representative width at both ends in the width direction. It should be understood that the specific values of the second number of times and the third amount may be set according to actual applications, which is not limited herein.

Referring back to FIG. 6, in step 620, the spatial layout of the plurality of connected regions is analyzed.

Figure 8:
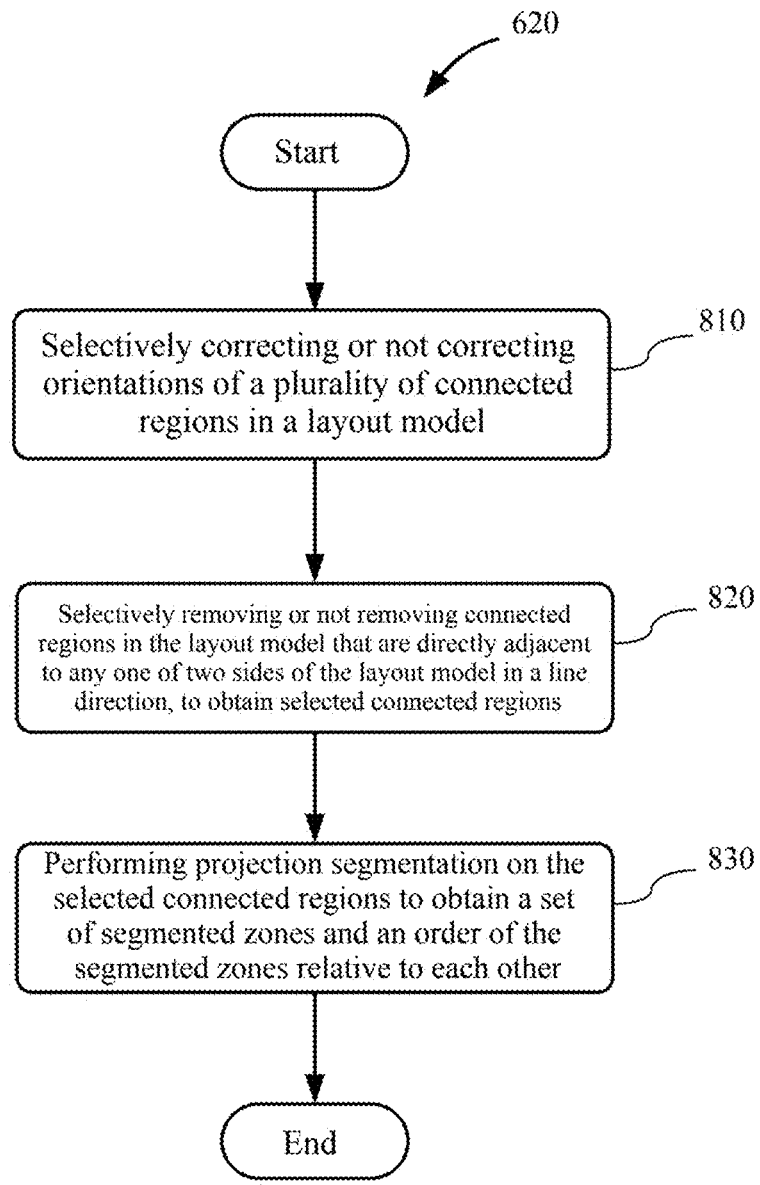
FIG. 8 is a flow chart showing an example process of analyzing a spatial layout of a plurality of connected regions in the method of FIG. 6.

FIG. 8 is a flow chart showing an example process for implementing step 620. According to some embodiments, the analyzing the spatial layout of the plurality of connected regions may include: selectively correcting or not correcting orientations of the plurality of connected regions in the layout model (step 810); selectively removing or not removing connected regions in the layout model that are directly adjacent to any one of two sides of the layout model in a line direction, to obtain respective selected connected regions (step 820); and performing projection segmentation on the respective selected connected regions to obtain a set of segmented zones and an order of the segmented zones relative to each other (step 830).

In step 810, the orientations of the plurality of connected regions in the layout model are selectively corrected or not corrected.

According to some embodiments, the selectively correcting or not correcting orientations of the plurality of connected regions in the layout model may include: determining whether the plurality of connected regions are in an inclined state with respect to any one of the line direction and the column direction of the layout model; and rotating the plurality of connected regions by a correction angle if it is determined that the plurality of connected regions are in an inclined state, so that the plurality of connected regions are not in the inclined state. The operation of correcting the inclined state is particularly advantageous for applications such as the application scenario 100 shown in FIG. 1. In these applications, readers usually hold books or other reading matter, and the text region in the image acquired by the image sensor is often inclined. Rotating the plurality of connected regions by the correction angle such that the plurality of connected regions are not in the inclined state can greatly improve the accuracy of the layout analysis. This provides advantages over a conventional layout analysis technique. In the conventional layout analysis technique, analyzed objects are generally flat images obtained through scanning by a scanner, wherein the text region is not inclined. Therefore, such conventional techniques may not be applicable to reading assisting scenarios.

According to some embodiments, the determining whether the plurality of connected regions are in an inclined state with respect to any one of the line direction and the column direction of the layout model can be implemented by the following process. First, the plurality of connected regions are searched for a specific connected region, wherein a minimum circumscribed rectangle of the specific connected region has the largest area among minimum circumscribed rectangles of the plurality of connected regions. Then, it is determined whether one edge of the minimum circumscribed rectangle of the specific connected region is parallel to any one of the line direction and the column direction. If it is determined that the edge of the minimum circumscribed rectangle of the specific connected region is not parallel to any one of the line direction and the column direction, it is determined that the plurality of connected regions are in the inclined state. If it is determined that the edge of the minimum circumscribed rectangle of the specific connected region is parallel to any one of the line direction and the column direction, it is determined that the plurality of connected regions are not in the inclined state.

Figure 9:
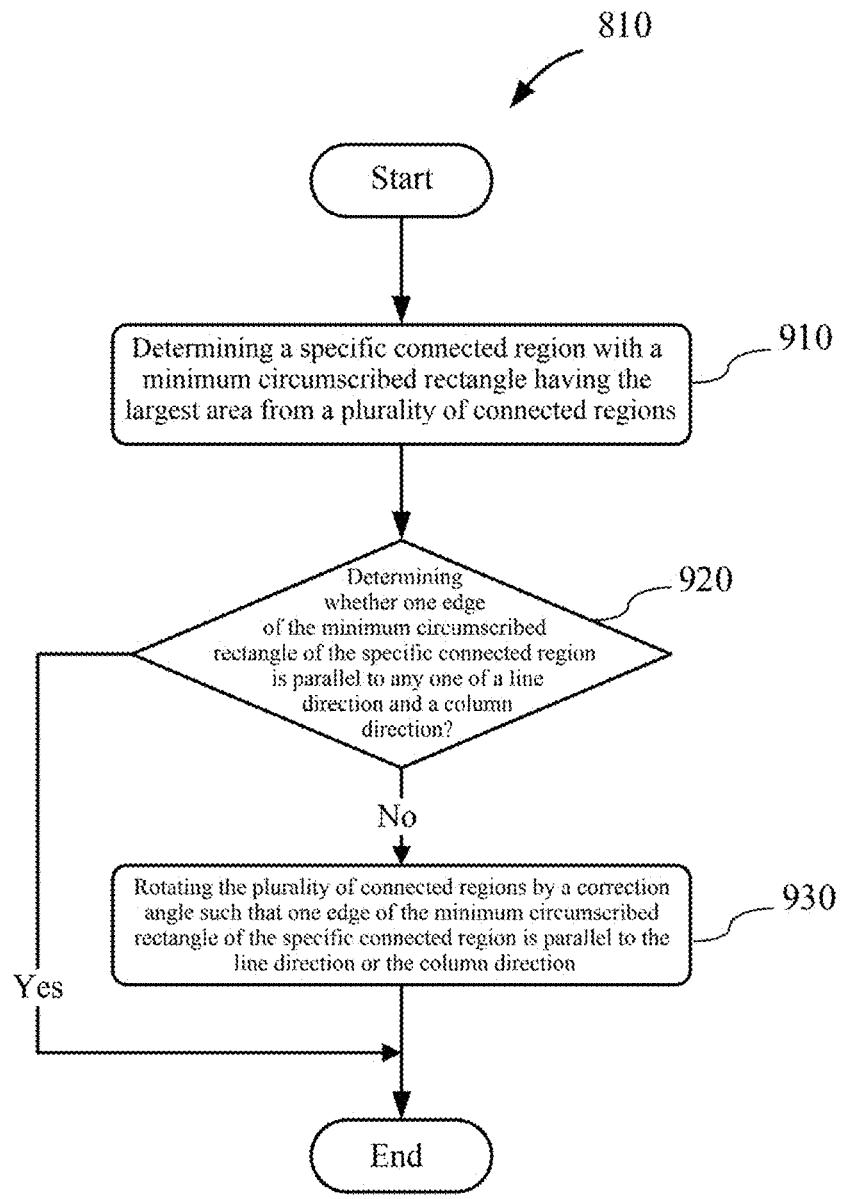
FIG. 9 is a flow chart showing an example process of selectively correcting orientations of a plurality of connected regions in the method of FIG. 8.

FIG. 9 is a flow chart showing an example process of selectively correcting orientations of a plurality of connected regions in the method of FIG. 8. As shown in FIG. 9, in step 910, a specific connected region with a minimum circumscribed rectangle having the largest area is determined from the plurality of connected regions obtained after the widths of the plurality of rectangular blocks are selectively adjusted. If one edge of the minimum circumscribed rectangle of the specific connected region is not parallel to any one of the line direction and the column direction (step 920, "No"), the plurality of connected regions are rotated by a correction angle such that the one edge of the minimum circumscribed rectangle of the specific connected region is parallel to the line direction or the column direction (step 930); otherwise (step 920, "Yes"), no correction processing is performed.

Figure 10:
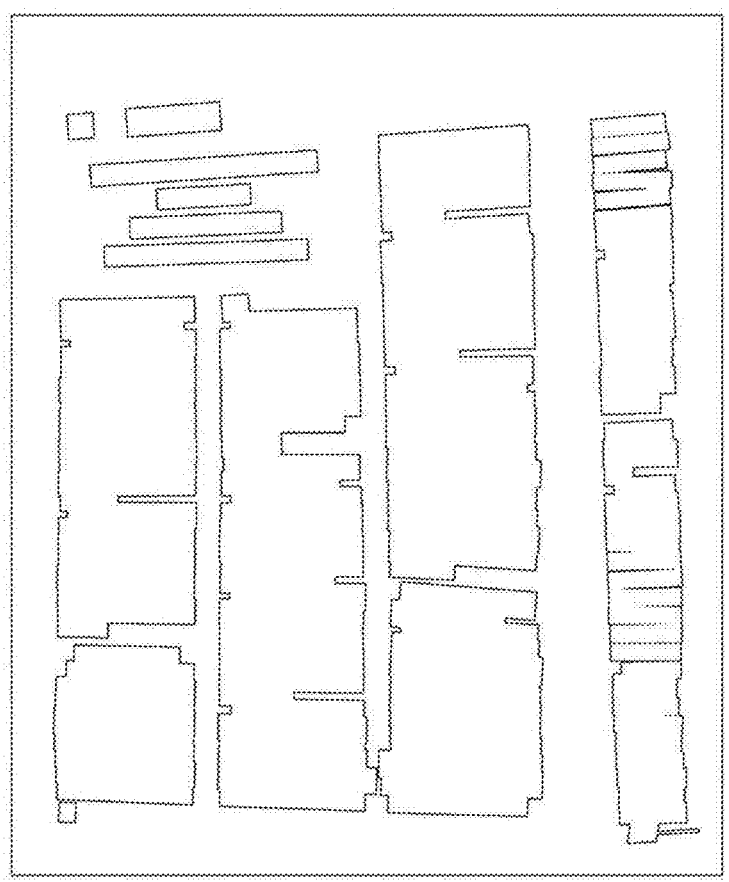
FIG. 10 is a schematic diagram showing a layout model obtained by performing angle correction on the layout model shown in FIG. 7 according to an exemplary embodiment.

FIG. 10 is a schematic diagram showing a layout model obtained by performing angle correction on the layout model 700 shown in FIG. 7 according to an exemplary embodiment. According to some embodiments, when the plurality of connected regions are not in the inclined state, the minimum circumscribed rectangles of the plurality of connected regions are all rotated around their mass centers (i.e., center points) by the same angle and in the same direction, so that one edge of the minimum circumscribed rectangle of the specific connected region is parallel to the line direction or the column direction.

According to some embodiments, it is possible to apply, for example, a Hough transform method to the minimum circumscribed rectangle of the specific connected region to detect an inclination angle, so as to obtain an inclination angle of the specific connected region, and in the case where the inclination angle is greater than or equal to a preset first inclination angle threshold (for example, 5°), inclination correction is performed on the plurality of connected regions, and the rotation directions and angles of the plurality of connected regions in the correction process are recorded.

It will be appreciated that the inclination correction method described above is only exemplary, and in other embodiments, any other appropriate correction method may be used.

Referring back to FIG. 8, in step 820, the connected regions in the layout model that are directly adjacent to any one of two sides of the layout model in the line direction are selectively removed or not removed, to obtain the respective selected connected regions.

In some cases, it also needs to filter incomplete pages of reading matter such as magazines and books that are folded or not photographed completely, so as to avoid performing text recognition and broadcast on text lines in the incomplete pages in the subsequent process. In view of these situations, according to some embodiments, if the plurality of connected regions are not in the inclined state, vertical projection segmentation is performed on the layout model. Then, depending on the result of the vertical projection segmentation, connected regions that are directly adjacent to any one of two sides of the layout model in the line direction are selectively removed or not removed from the plurality of connected regions, to obtain the selected connected regions. As used herein, the phrase "the connected region being directly adjacent to one side of the layout model" means that there is no other connected region between the connected region and the side of the layout model.

Figure 11:
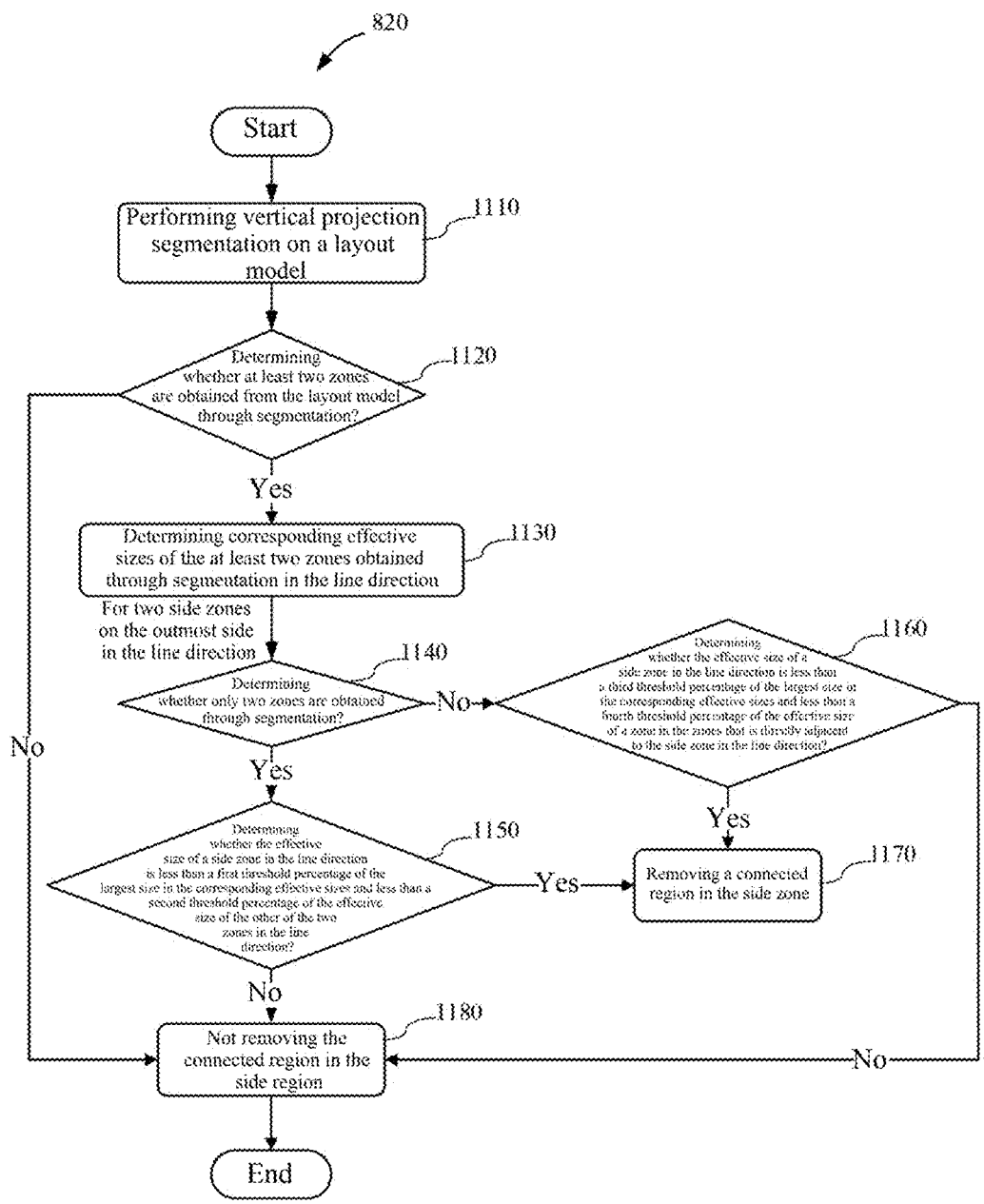
FIG. 11 is a flow chart showing an example process of selectively removing connected regions directly adjacent to any one of two sides of the layout model in the method of FIG. 8.

FIG. 11 is a flow chart showing an example process of selectively removing connected regions directly adjacent to any one of two sides of the layout model in the method of FIG. 8. Through the process shown in FIG. 11, connected regions representing paragraphs in an incomplete page are filtered out from the layout model. As shown in FIG. 11, first, vertical projection segmentation is performed on the layout model (step 1110). It is determined whether at least two zones have been obtained from the layout model through the vertical projection segmentation (step 1120), wherein the at least two zones include the plurality of connected regions. If it is determined that at least two zones have not been obtained from the layout model through segmentation (step 1120, "No"), the removal is not performed (step 1180). If it is determined that at least two zones have been obtained from the layout model through segmentation (step 1120, "Yes"), corresponding effective sizes of the at least two zones in the line direction are determined (step 1130), and the following operation is performed on each side zone of the at least two zones that is directly adjacent to any one of the two sides of the layout model in the line direction: if two zones have been obtained from the layout model through segmentation (step 1140, "Yes"), and the effective size of a side zone in the line direction is less than a first threshold percentage of the largest size in the corresponding effective sizes and less than a second threshold percentage of the effective size of the other of the two zones in the line direction (step 1150, "Yes"), a connected region in the side zone is removed (step 1170), otherwise, the connected region in the side zone is not removed (step 1180); if more than two zones have been obtained from the layout model through segmentation (step 1140, "No"), and the effective size of the side zone in the line direction is less than a third threshold percentage of the largest size in the corresponding effective sizes and less than a fourth threshold percentage of the effective size of a zone in the zones that is directly adjacent to the side zone in the line direction (step 1160, "Yes"), a connected region in the side zone is removed (step 1170), otherwise, the connected region in the side zone is not removed (step 1180).

As used herein, the phrase "a zone being directly adjacent to one side of the layout model" means that there is no other zone between the zone and the side of the layout model.

As used herein, the effective size of a zone in the line direction refers to the size of connected regions in the zone in the line direction, such as the size of the minimum circumscribed rectangles of these connected regions in the line direction. In some embodiments, the effective size of a zone in the line direction may be the average of the sizes of all the connected regions in the zone in the line direction.

Through the above steps, incomplete pages of reading matter such as magazines and books that are folded or not photographed completely can be filtered, so as to avoid performing text recognition and broadcast on text lines in the incomplete pages in the subsequent process and causing confusion in the reading content. This can greatly improve the accuracy of layout analysis, thereby improving the user experience.

According to some embodiments, the first threshold percentage is less than the second threshold percentage, and the third threshold percentage is equal to the fourth threshold percentage.

According to some embodiments, for example, the first threshold percentage is 60%, and the second threshold percentage is 70%; the third threshold percentage is 70%, and the fourth threshold percentage is 70%. It should be understood that the specific values of the first threshold percentage, the second threshold percentage, the third threshold percentage, and the fourth threshold percentage may be set according to actual applications, which is not limited herein.

It should be understood that "horizontal projection segmentation" and "vertical projection segmentation" themselves are known text segmentation techniques. Horizontal projection segmentation involves searching a two-dimensional image for pixel lines that meet predetermined conditions as horizontal dividing lines. In the case of a binarized image, such a pixel line may be a pixel line with the sum of pixel values being equal to zero. Vertical projection segmentation involves searching a two-dimensional image for pixel columns that meet predetermined conditions as vertical dividing lines. In the case of a binarized image, such a pixel column may be a pixel column with the sum of pixel values being equal to zero. In some embodiments of the present disclosure, the data structure of the layout model may be in the form of a two-dimensional matrix, and the pixel values are data values of matrix elements of the two-dimensional matrix.

Figure 12:
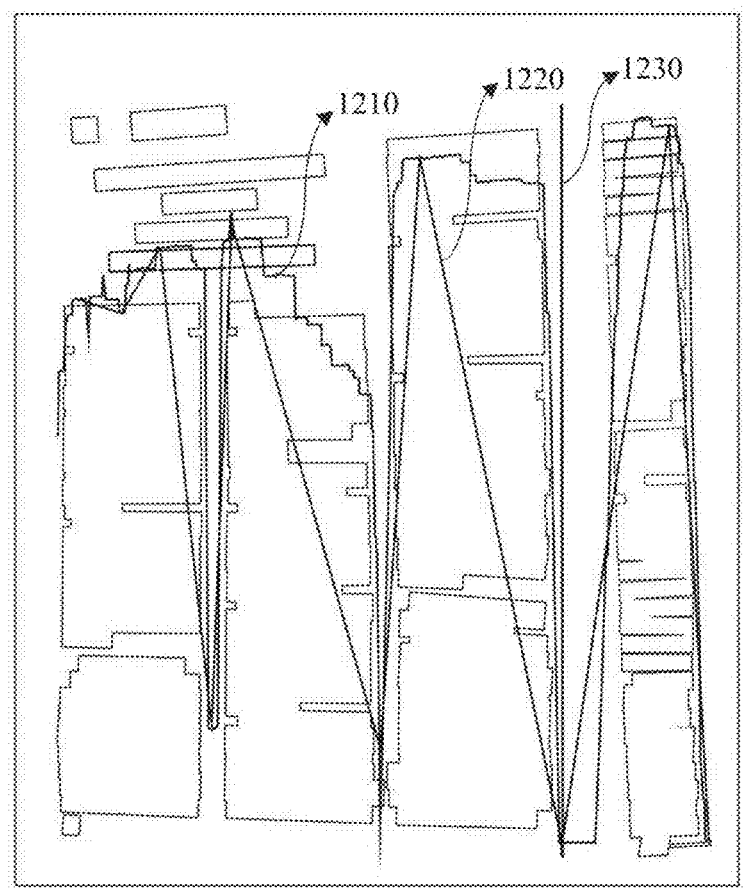
FIG. 12 is a schematic diagram showing performing vertical projection on the layout model shown in FIG. 10 according to an exemplary embodiment.

FIG. 12 is a schematic diagram showing performing vertical projection on the layout model shown in FIG. 10 according to an exemplary embodiment. To facilitate intuitive understanding, FIG. 12 shows a waveform 1210 indicating the sum of the data values of the data elements of each data column, a connecting line 1220 indicating the connection between a peak and a trough of the waveform 1210, and a vertical dividing line 1230. As shown in FIG. 12, the sum of data values of the data elements of the data column corresponding to the vertical dividing line 1230 is the minimum value (e.g., zero), and therefore, the data column may be selected as the vertical dividing line. Similarly, the sum of data values of data elements of each of several data columns located on the right side of the vertical dividing line 1230 is also the minimum value, and therefore any one of these data columns may also be selected as the vertical dividing line.

Figure 13:
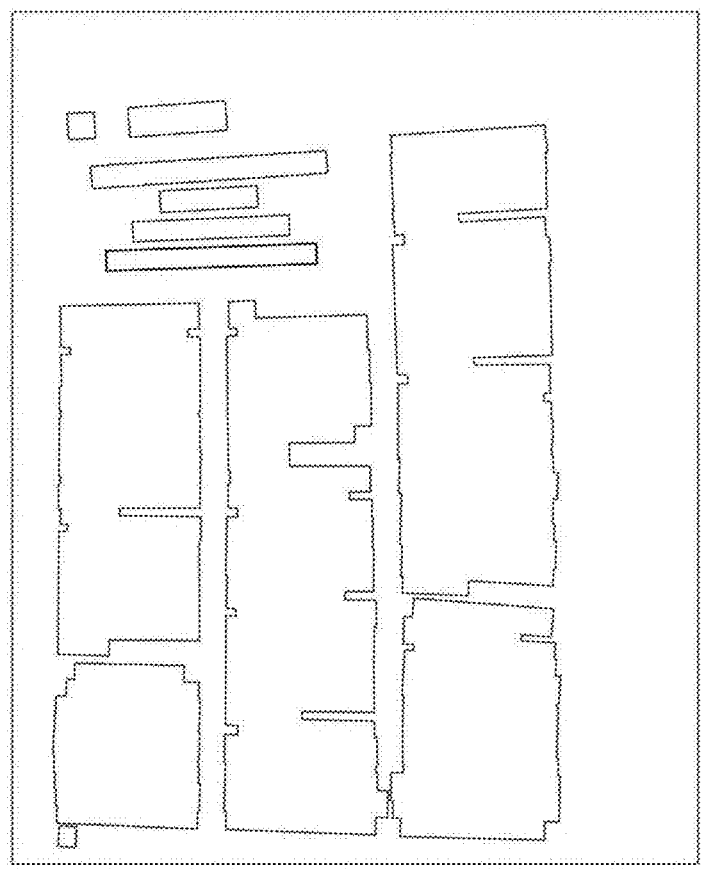
FIG. 13 is a schematic diagram showing a layout model obtained after removal of connected regions representing an incomplete page from the layout model shown in FIG. 10 according to a projection result of FIG. 12.

FIG. 13 is a schematic diagram showing a layout model obtained after removal of connected regions representing an incomplete page from the layout model shown in FIG. 10 according to a projection result of FIG. 12. As shown in FIG. 13, the connected regions representing paragraphs in the incomplete page located on the rightmost side in FIG. 12 has been removed.

According to some embodiments, before the vertical projection segmentation is performed on the layout model, the sizes of the text lines may be properly adjusted in the left-right direction, so as to improve the accuracy of removing an incomplete page. The length of each rectangular block corresponding to a text line determined as a horizontal layout type may be increased by several data elements at both ends in the length direction. The width of each rectangular block corresponding to a text line determined as a vertical layout type may be increased by several data elements at both ends in the width direction. The several data elements above have, for example, 0.5 time the representative width. It will be appreciated that the length of a rectangular block is generally greater than the width thereof. In some examples, the layout type may be a default type (for example, the default type is a horizontal layout). In other examples, a user can also manually switch to set the layout type. For example, the user may change the default layout type to a vertical layout. Before vertical projection segmentation is performed to remove an incomplete page, properly adjusting the sizes of the text lines in the left-right direction can improve the accuracy of removing the incomplete page. This is because the size adjustment in the left-right direction makes it difficult for connected regions representing paragraphs located on the same page to be segmented from the layout model through vertical projection segmentation, thereby reducing the chance of being removed by mistake.

Referring back to FIG. 8, in step 830, projection segmentation is performed on the respective selected connected regions to obtain a set of segmented zones and an order of the segmented zones relative to each other.

According to some embodiments, after incomplete pages of the layout model are filtered out, horizontal projection segmentation and vertical projection segmentation are recursively and alternately performed on the respective selected connected regions of the layout model to obtain a set of segmented zones through segmentation from the layout model, and an order of respective segmented zones in the set of segmented zones relative to each other is determined based on a reading order rule.

According to some embodiments, the recursively and alternately performing horizontal projection segmentation and vertical projection segmentation on the respective selected connected regions may include cyclically performing the following operations: performing vertical projection segmentation on each horizontal segmented zone obtained through horizontal projection segmentation, and performing horizontal projection segmentation on each vertical segmented zone obtained through vertical projection segmentation, until each segmented zone cannot be segmented through horizontal projection segmentation and vertical projection segmentation. The segmented zones that cannot be segmented through horizontal projection segmentation and vertical projection segmentation form the set of segmented zones.

It will be appreciated that the order of horizontal projection segmentation and vertical projection segmentation can be reversed. That is, in the above cyclic operation, the first projection segmentation may be horizontal projection segmentation, or may be vertical projection segmentation. The present disclosure is not limited in this respect. It will also be appreciated that recursion refers to a strategy of transforming a large and complex problem into a smaller problem similar to the original problem. In the context of computer programming, the recursion strategy only needs a small number of programs to describe a plurality of repetitive calculations required in the process of solving problems, which can greatly reduce the code amount of the programs.

According to some embodiments, the performing vertical projection segmentation on each horizontal segmented zone obtained through horizontal projection segmentation includes: searching the horizontal segmented zone for a set of data columns, wherein the sum of data values of data elements of each data column in the set of data columns is in a range from zero to a first threshold. The first threshold is greater than zero, and is, for example, one time the representative width. If the set of data columns is found, a vertical dividing line for segmenting the horizontal segmented zone is selected from the set of data columns, and the horizontal segmented zone is segmented using the selected vertical dividing line to obtain a vertical segmented zone. Herein, the sum of the data values of the data column indicating the vertical dividing line is selected to be in the range from zero to the first threshold, instead of being equal to zero. This is because the horizontal interval between paragraphs on the same page is small, and selecting a larger sum of data values of the data column indicating the vertical dividing line can facilitate the correct execution of the vertical projection segmentation.

According to some embodiments, the performing horizontal projection segmentation on each vertical segmented zone obtained through vertical projection segmentation includes: searching the vertical segmented zone for a set of data lines, wherein the sum of data values of matrix elements of each data line in the set of data lines is in a range from zero to a second threshold. The second threshold is greater than zero, and is, for example, one time the representative width. If the set of data lines is found, a horizontal dividing line for segmenting the vertical segmented zone is selected from the set of data lines, and the vertical segmented zone is segmented using the selected horizontal dividing line to obtain a horizontal segmented zone. Herein, the sum of the data values of the data column indicating the horizontal dividing line is selected to be in the range from zero to the second threshold, instead of being equal to zero. This is because the vertical interval between paragraphs on the same page is small, and selecting a larger sum of data values of the data column indicating the horizontal dividing line can facilitate the correct execution of the horizontal projection segmentation.

According to some embodiments, the set of segmented zones is obtained from the layout model through segmentation based on the above horizontal dividing line and vertical dividing line for segmenting the layout model.

Figure 14:
FIGS. 14 to 17 are respectively schematic diagrams showing performing projection segmentation on the layout model shown in FIG. 13 according to an exemplary embodiment.
Figure 15:
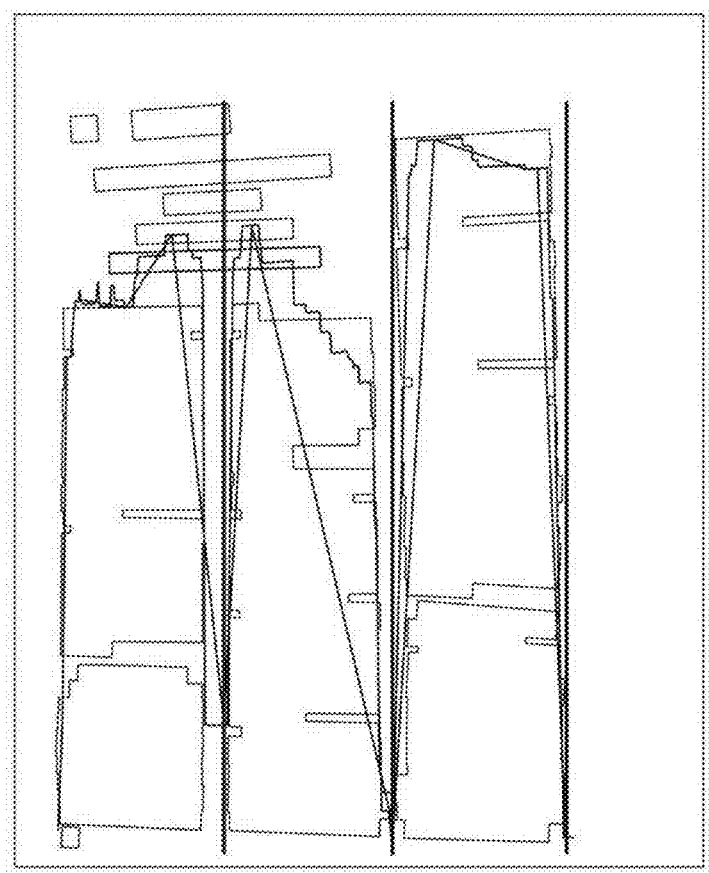
Figure 16:
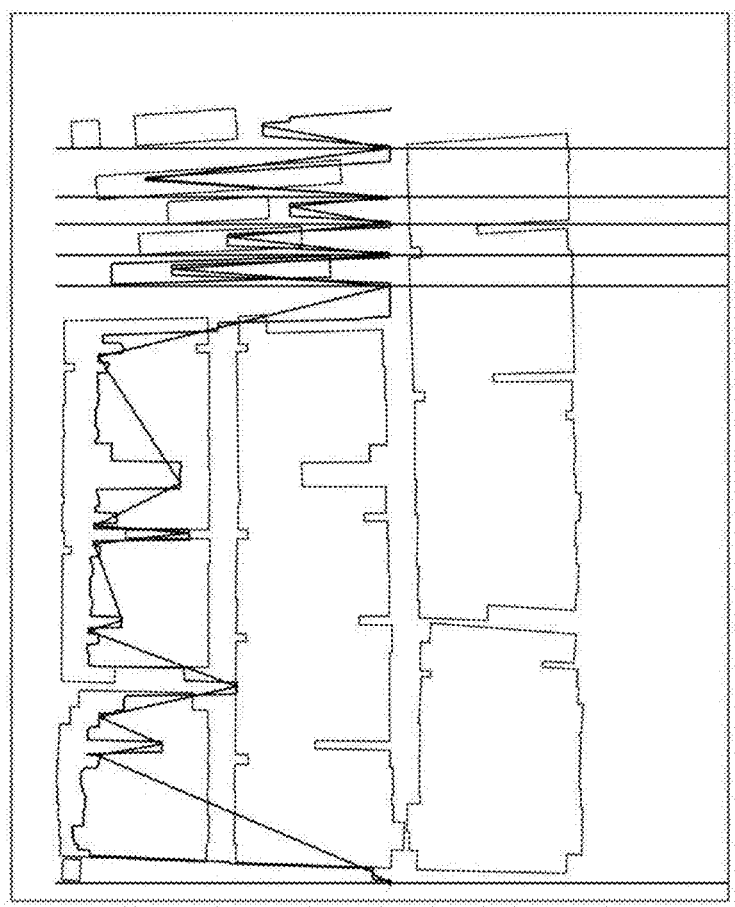
Figure 17:
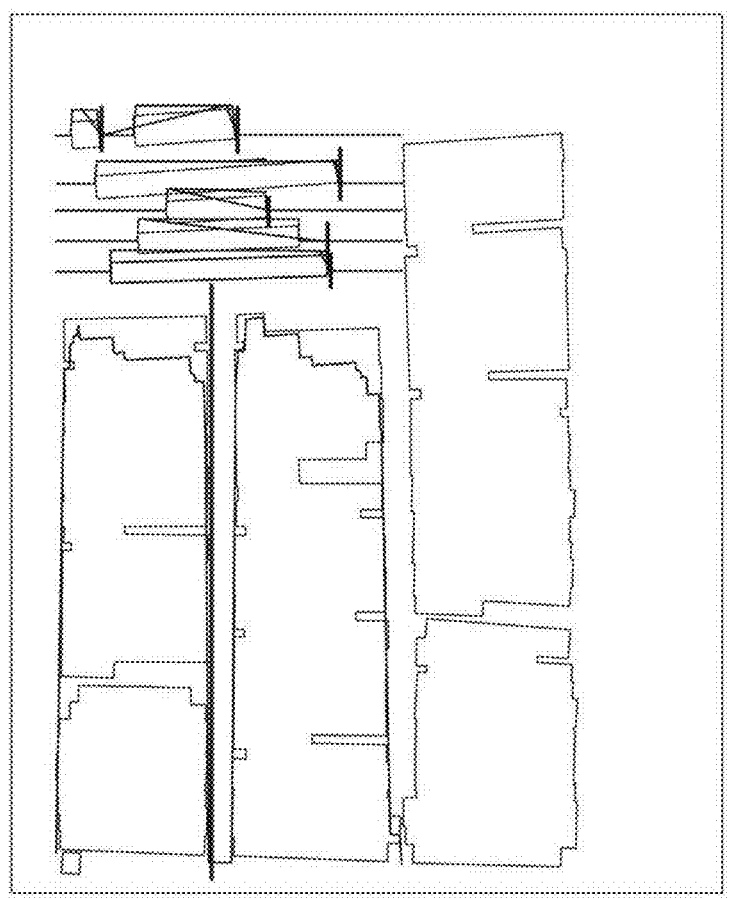
Figure 18:
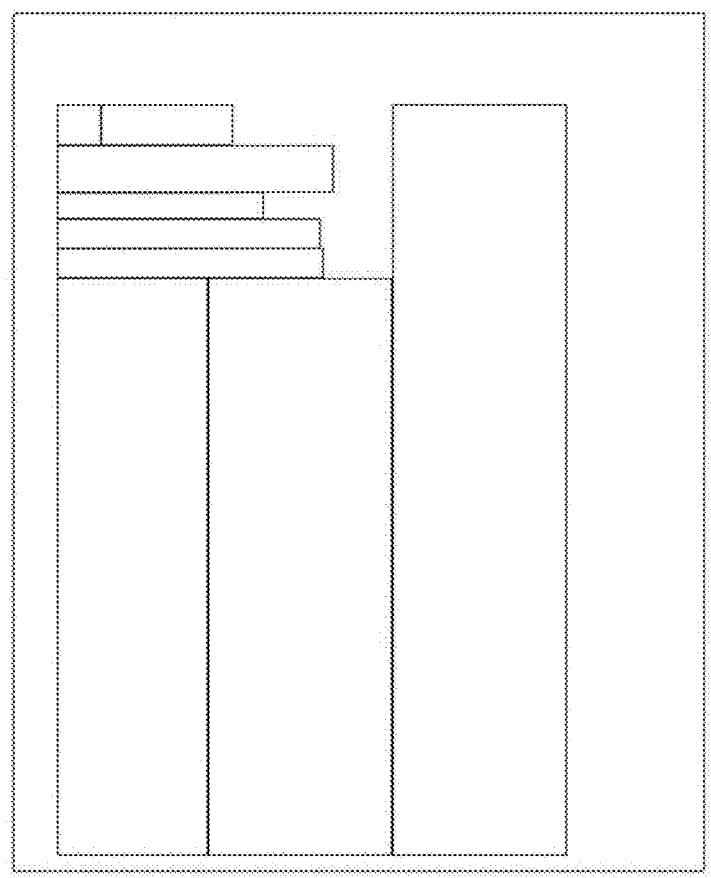
FIG. 18 is a schematic diagram showing a layout model including a finally obtained set of segmented zones according to an exemplary embodiment.

FIGS. 14 to 17 are respectively schematic diagrams showing performing segmentation on the layout model shown in FIG. 13 according to an exemplary embodiment. In this example, as shown in FIG. 14, horizontal projection segmentation is performed once, and the corresponding zone is not obtained through segmentation in this projection. Then, as shown in FIG. 15, vertical projection segmentation is performed. This segmentation process separates the rightmost zone of the layout model from the other parts of the layout model. Horizontal projection segmentation continues to be performed. The horizontal projection segmentation is separately performed on the zone obtained through segmentation and the remaining connected regions in FIG. 15, but the zone obtained through segmentation in the previous step cannot be segmented anymore. As shown in FIG. 16, the remaining connected regions in FIG. 15 are segmented to obtain a plurality of segmented zones on the upper left in this horizontal projection segmentation process. As shown in FIG. 17, vertical segmentation continues to be performed on the zone obtained through segmentation in the previous step, until each segmented zone cannot be segmented through horizontal projection segmentation and vertical projection segmentation. Finally, a set of all segmented zones that are obtained through segmentation form a layout model shown in FIG. 18.

According to some embodiments, determining the order of respective segmented zones in the set of segmented zones relative to each other includes: recording, in performing the operations cyclically, hierarchical relationships between horizontal segmented zones, between vertical segmented zones, and between the horizontal segmented zones and the vertical segmented zones in a hierarchy tree data structure, wherein leaf nodes in the hierarchy tree data structure represent the set of segmented zones; and traversing the leaf nodes according to the reading order rule, wherein an order of traversing the leaf nodes represents an order of the respective segmented zones in the set of segmented zones relative to each other.

In some examples, leaf nodes may record the coordinate information of corresponding zones, such as coordinate information of a dividing line between the zones or the coordinate information of a rectangle formed by the dividing line. The coordinate information reflects a positional relationship between different zones, so that in the process of traversing the leaf nodes, the order between the different zones can be determined according to the reading order rule. The reading order rule will be described subsequently.

In some examples, in performing the operations cyclically, segmented zones obtained through segmentation every time are marked in the hierarchy tree data structure according to the reading order. After a segmented zone that can be segmented again through horizontal projection segmentation or vertical projection segmentation is segmented next time, segmented zones obtained through segmentation from the segmented zone are marked in the hierarchy tree data structure as subnodes of the segmented zone, until each segmented zone cannot be segmented through horizontal projection segmentation and vertical projection segmentation; and at this time, the entire hierarchy tree data structure is marked.

According to some embodiments, the reading order rule includes: if it is determined that the plurality of text lines are of a horizontal layout type, arranging the vertical segmented zones from left to right according to a positional relationship between the vertical segmented zones, and arranging the horizontal segmented zones from top to bottom according to a positional relationship between the horizontal segmented zones; alternatively, if it determined that the plurality of text lines are of a vertical layout type, arranging the vertical segmented zones from right to left according to a positional relationship between the vertical segmented zones, and arranging the horizontal segmented zones from top to bottom according to a positional relationship between the horizontal segmented zones.

A tree structure is used to store the hierarchical relationship between the segmented zones, and the order of the leaf nodes is determined through the reading order rule, so that the layout analysis method according to the embodiment of the present disclosure can adapt to a horizontal layout and a vertical layout, thereby improving the universality of the layout analysis method.

Figure 19:
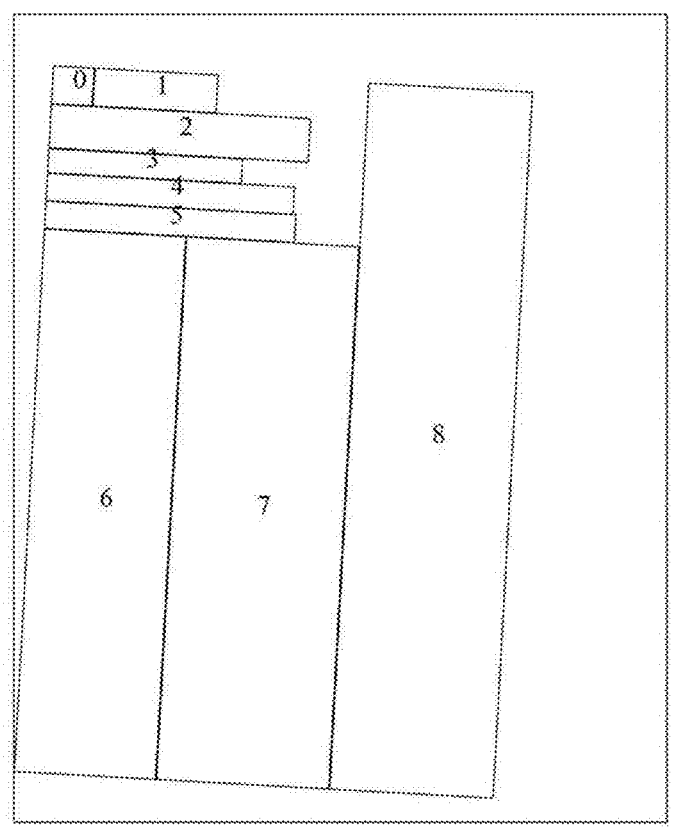
FIG. 19 is a schematic diagram showing the layout model shown in FIG. 18 after the model is adjusted to an original inclined state and the segmented zones are arranged according to a reading order.

According to some embodiments, the analyzing a spatial layout of a plurality of connected regions may further include, after the performing projection segmentation on the respective selected connected regions: determining whether each of the selected connected regions has ever been rotated by a correction angle; and reversely rotating the set of segmented zones by the correction angle if it is determined that each of the selected connected regions has ever been rotated by the correction angle. FIG. 19 is a schematic diagram showing the layout model shown in FIG. 18 after the model is adjusted to an original inclined state and the segmented zones are arranged according to a reading order, wherein the numbers 0 to 8 represent the numbers and reading order of the segmented zones. The layout model is adjusted to the original inclined state, so that it is convenient to match the text lines in the original image with rectangular blocks in the layout model in the subsequent processing, thereby improving the processing speed.

Referring back to FIG. 3, in step 340, the order of the text lines relative to each other is determined based on the layout structure.

According to some embodiments, the determining an order of the text lines relative to each other based on the layout structure may include: determining, according to a relative position of each of the selected connected regions with respect to each segmented zone in the set of segmented zones, a correspondence between each of the selected connected regions and each segmented zone, wherein each segmented zone contains a corresponding set of selected connected regions; arranging selected connected regions in the corresponding set of selected connected regions according to a positional relationship between the selected connected regions in the corresponding set of selected connected regions; arranging rectangular blocks in each selected connected region according to a positional relationship between the rectangular blocks in the selected connected region; and matching the plurality of text lines with the rectangular blocks in each selected connected region according to a correspondence between the plurality of text lines and the plurality of rectangular blocks.

In some embodiments, the relative positions of the centers or mass centers of the respective selected connected regions relative to the respective segmented zones in the set of segmented zones can be determined to determine segmented zones where the respective selected connected regions are respectively located. For example, if a center or mass center of a certain selected connected region falls within a certain segmented zone, it can be determined that the certain selected connected region is located within the certain segmented zone. In these examples, based on the positions of the centers or mass centers of the respective selected connected regions in the segmented zone, the selected connected regions in the segmented zone can be arranged.

According to some embodiments, the arranging the selected connected regions in the corresponding set of selected connected regions may include: arranging the selected connected regions in the corresponding set of selected connected regions from top to bottom if it is determined that the plurality of text lines are of a horizontal layout type; and arranging the selected connected regions in the corresponding set of selected connected regions from right to left if it is determined that the plurality of text lines are of a vertical layout type.

Figure 20:
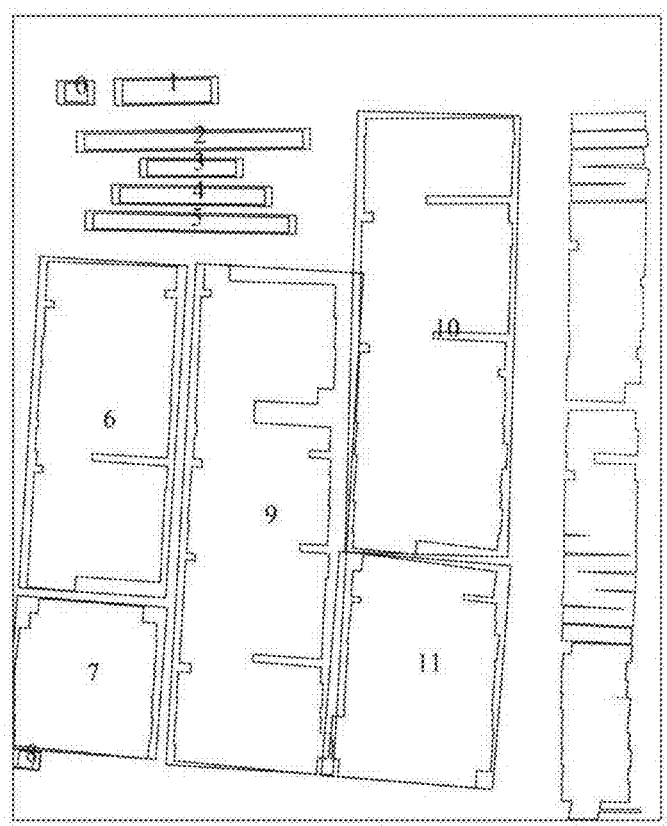
FIG. 20 is a schematic diagram shown after a plurality of connected regions and segmented zones are matched and arranged according to an exemplary embodiment.

FIG. 20 is a schematic diagram shown after a plurality of connected regions and segmented zones are matched and arranged according to an exemplary embodiment. As shown in FIG. 20, connected regions 0 to 5 respectively match corresponding segmented zones 0-5 shown in FIG. 19; connected regions 6 to 8 match a segmented zone 6 shown in FIG. 19; a connected region 9 matches a segmented zone 7 shown in FIG. 19; and connected regions 10 and 11 match a segmented zone 8 shown in FIG. 19.

After the connected regions are arranged, rectangular blocks in each of the connected regions can be arranged.

According to some embodiments, the arranging rectangular blocks in each selected connected region includes: arranging the rectangular blocks in each selected connected region from top to bottom if it is determined that the plurality of text lines are of a horizontal layout type; and arranging the rectangular blocks in each selected connected region from right to left if it is determined that the plurality of text lines are of a vertical layout type.

When the size of the layout model is the same as the size of the image, the coordinate information of the text lines in the image is consistent with the coordinate information of the rectangular blocks in the layout model. When the size of the layout model is scaled compared to the size of the image, the coordinate information of the text lines in the image is also inversely scaled relative to the coordinate information of the rectangular blocks in the layout model. As such, the plurality of text lines in the image can be matched with the rectangular blocks in the respective selected connected regions according to a correspondence between the plurality of text lines in the image and the plurality of rectangular blocks in the layout model, so as to arrange the text lines in the image.

Figure 21:
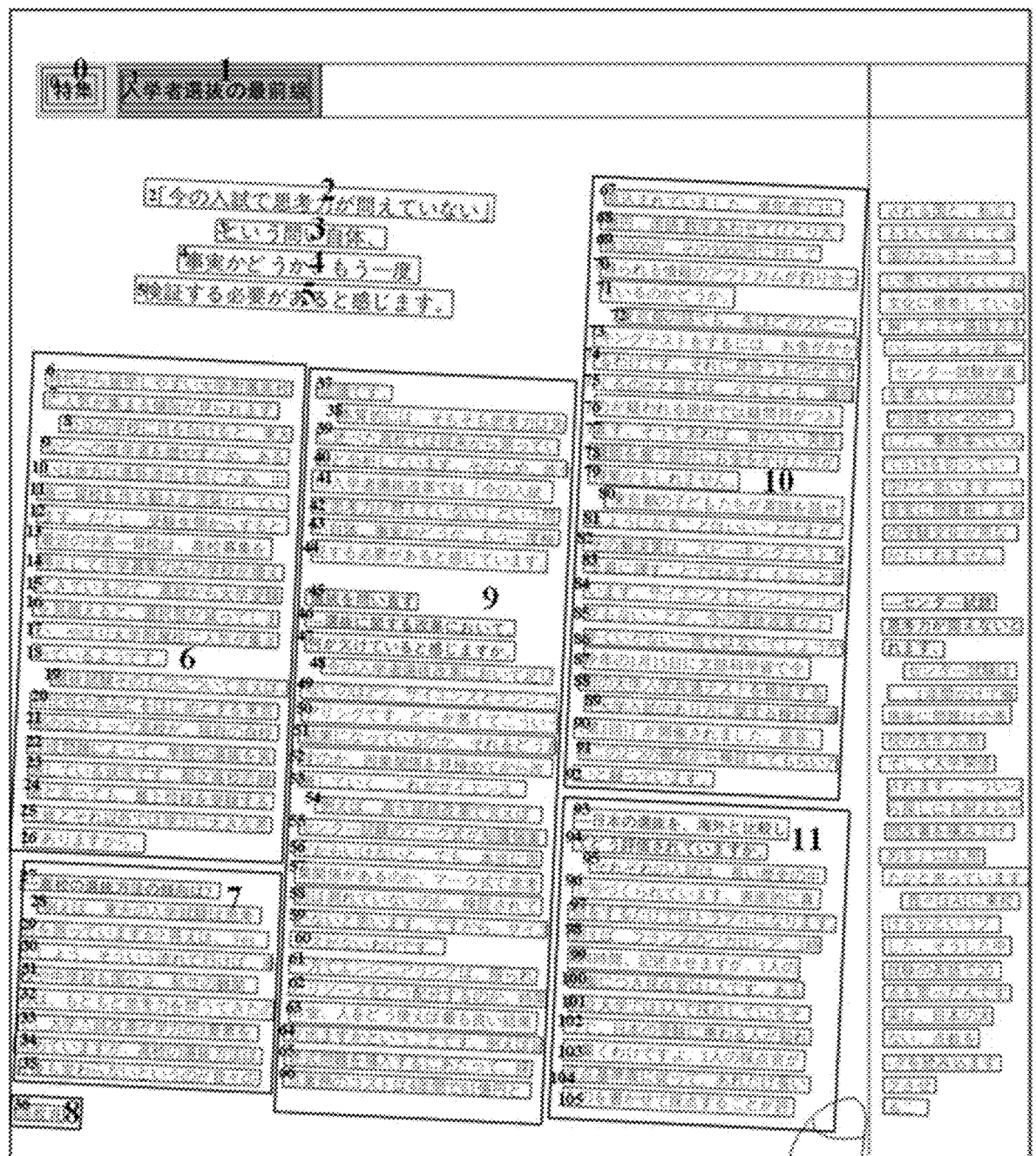
FIG. 21 is a schematic diagram showing arranging text lines in the image of FIG. 4 based on a layout analysis result according to an exemplary embodiment.

FIG. 21 is a schematic diagram showing arranging text lines in the image 400 according to a layout analysis result according to an exemplary embodiment. As shown in FIG. 21, text lines 0 to 5 are respectively in the corresponding connected regions 0 to 5 shown in FIG. 20; text lines 6 to 26 are in the connected region 6 shown in FIG. 20; text lines 27 to 35 are in the connected region 7 shown in FIG. 20; a text line 36 is in the connected region 8 shown in FIG. 20; text lines 37 to 66 are in the connected region 9 shown in FIG. 20; text lines 67 to 92 are in the connected region 10 shown in FIG. 20; and text lines 93 to 105 are in the connected region 11 shown in FIG. 20.

According to some embodiments, step 620 of analyzing the spatial layout of the plurality of connected regions in FIG. 6 may further include the following operations, before the recursively and alternately performing horizontal projection segmentation and vertical projection segmentation on the respective selected connected regions: decreasing the length of each rectangular block in the respective selected connected regions by several data elements at both ends in the length direction if it is determined that the plurality of text lines are of a horizontal layout type; and decreasing the width of each rectangular block in the respective selected connected regions by several data elements at both ends in the width direction if it is determined that the plurality of text lines are of a vertical layout type.

Before horizontal projection segmentation and vertical projection segmentation are recursively and alternately performed on the respective selected connected regions, adjusting the sizes of the rectangular blocks corresponding to the respective text lines in the left-right direction can eliminate the interference of an image background color and the like between paragraphs, and improve the accuracy of segmentation.

The embodiment where the layout type of the text lines is determined as a horizontal layout or a vertical layout by default (which can be manually switched) in the layout analysis process has been described above. Hereinafter, some additional embodiments of the present disclosure will be described, wherein the layout type of the text lines is automatically recognized. Automatic recognition of the layout type can provide some advantages. For example, the order of the text lines relative to each other can be correctly determined according to the automatically recognized layout type, without a user's manual switching. In the case where the image includes both text lines of a main layout type (for example, a horizontal layout) and text lines of a sub-layout type (for example, a vertical layout), this further allows the implementation of some useful functions. For example, the layout analysis may be performed on the text lines of the main layout type first, and then the layout analysis may be performed on the text lines of the sub-layout type, so that the text lines of the main layout type may be first recognized and speech-broadcast. This can improve the user's usage experience of a reading assisting device, because the text lines of the main layout type are generally the content that the user wants to know first.

According to some embodiments, before the layout structure of the text lines is analyzed based on the layout model, a main layout type of the plurality of text lines is recognized. The main layout type includes one selected from the group consisting of a horizontal layout type and a vertical layout type. According to some embodiments, the recognizing the main layout type of the plurality of text lines may include: determining respective geometric parameters of the plurality of rectangular blocks according to the coordinate information of the plurality of text lines in the image; and determining a main layout type of the plurality of text lines based on the respective geometric parameters of the plurality of rectangular blocks.

In some examples, referring back to FIGS. 4 and 5, geometric parameters of each rectangular block 510 in the layout model 500 can be determined according to coordinate information of the plurality of text lines 410 in the image 400 and a correspondence between the plurality of text lines 410 and the plurality of rectangular blocks 510 in the layout model 500. For example, when the size of the layout model 500 is the same as the size of the image 400, coordinates of the rectangular blocks 510 in the layout model 500 are the same as coordinates of the corresponding text lines 410 in the image 400, and geometric parameters of the rectangular blocks 510 may be determined directly from the coordinates (for example, the coordinates of the four vertices) of the corresponding text line 410.

According to some embodiments, the geometric parameters include at least one of a length direction, a length, a width direction, and a width of each of the plurality of rectangular blocks 510. In the case where the text line extends in the substantially left-right direction relative to a reader (i.e., in horizontal layout reading matter), the length direction is the substantially left-right extending direction, and the width direction is the direction that is substantially perpendicular to the substantially left-right extending direction (i.e., the substantially up-down extending direction); and in the case where the text line extends in the substantially up-down direction relative to the reader (i.e., in vertical layout reading matter), the length direction is the substantially up-down extending direction, and the width direction is a direction substantially perpendicular to the substantially up-down extending direction (i.e., the substantially left-right extending direction).

According to some embodiments, the text arrangement direction of the text line 410 corresponding to the rectangular block 510 is determined according to the respective geometric parameters of the rectangular block 510, so as to determine whether the layout type of the text line 410 is a horizontal layout or a vertical layout. In some embodiments, the layout type of the text line 410 can be obtained by determining the length direction of the rectangular block 510 corresponding to the text line 410. For example, if the rectangular block 510 extends in the left-right direction, the corresponding text line 410 has a horizontal layout, and if the rectangular block 510 extends in the up-down direction, the corresponding text line 410 has a vertical layout. In the text region of the entire image 400, if the proportion of text lines 410 of a certain layout type (a horizontal layout or a vertical layout) exceeds a predetermined threshold, the certain layout type is the main layout type.

Figure 22:
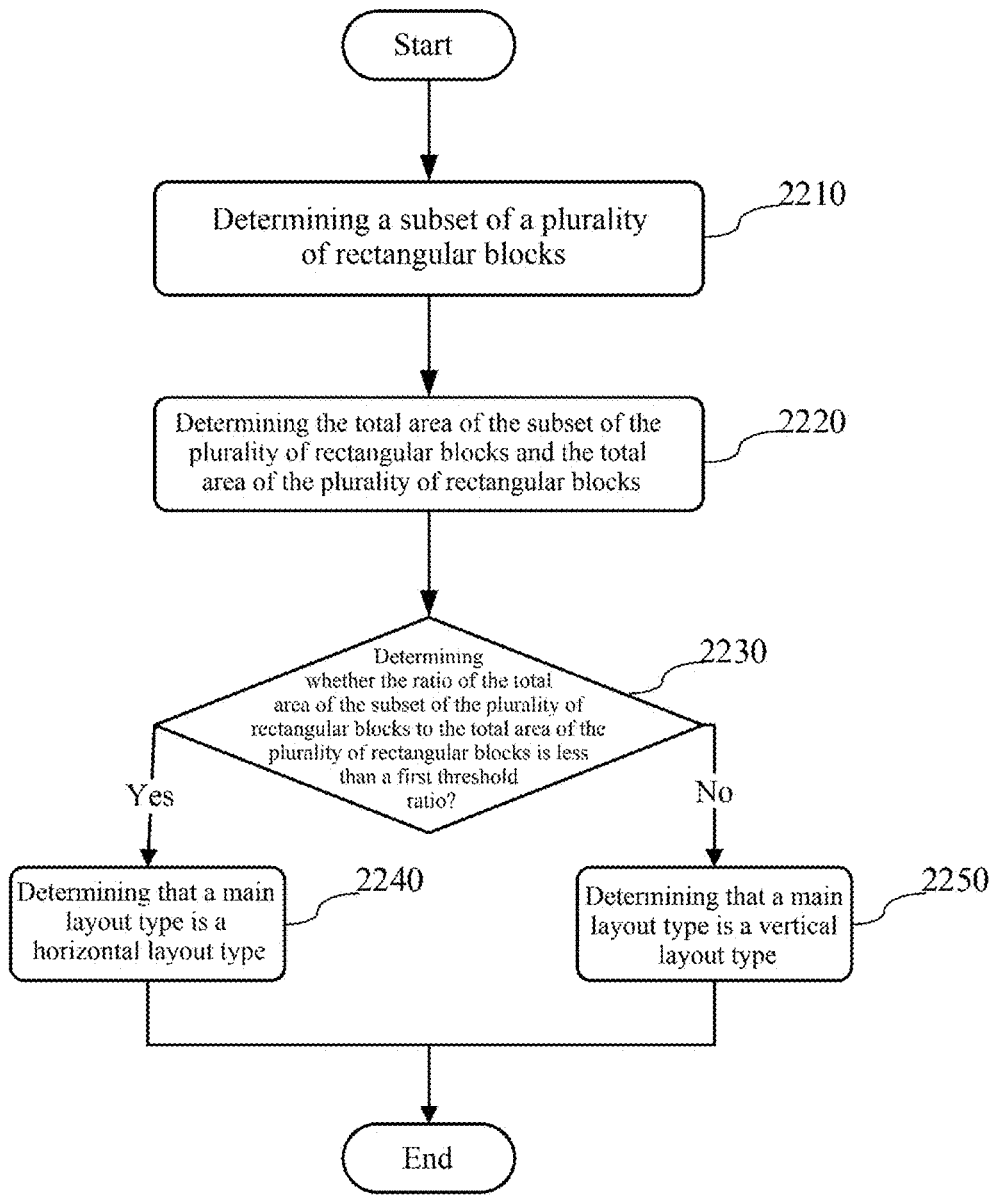
FIG. 22 is a flow chart showing an example process of determining a main layout type of text lines according to an exemplary embodiment.

FIG. 22 is a flow chart showing an example process of determining a main layout type of a plurality of text lines based on respective geometric parameters of a plurality of rectangular blocks. In this example, a rule for determining the main layout type is that if the ratio of the total area of the rectangular blocks corresponding to text lines of a vertical layout to the total area of all the rectangular blocks is greater than or equal to the predetermined threshold, the main layout type is a vertical layout, otherwise, the main layout type is a horizontal layout.

In step 2210, a subset of the plurality of rectangular blocks is determined, wherein the subset of the plurality of rectangular blocks is composed of rectangular blocks, in the plurality of rectangular blocks, meeting the following conditions: an included angle between the length direction of each rectangular block and the column direction of the layout model is less than a threshold angle. According to some embodiments, the threshold angle may be, for example, 10°, 20°, or 30°, but is not limited to these examples, and can be set according to actual applications. As used herein, a subset of a plurality of elements may include some or all of the plurality of elements, that is, the subset may be a "universal set", a "proper subset", or an "empty set". In the case of the "universal set", all the rectangular blocks in the plurality of rectangular blocks meet the above conditions. In the case of the "proper subset", some rectangular blocks in the plurality of rectangular blocks meet the above conditions. In the case of the "empty set", no rectangular block in the plurality of rectangular blocks meets the above conditions.

In step 2220, the total area of the subset of the plurality of rectangular blocks and the total area of the plurality of rectangular blocks are determined, and in step 2230, it is determined whether the ratio of the total area of the subset of the plurality of rectangular blocks to the total area of the plurality of rectangular blocks is less than a first threshold ratio. If the ratio of the total area of the subset of the plurality of rectangular blocks to the total area of the plurality of rectangular blocks is less than the first threshold ratio (step 2230, "Yes"), it is determined that the main layout type is a horizontal layout type (step 2240), otherwise (step 2230, "No"), it is determined that the main layout type is a vertical layout type (step 2250). According to some embodiments, the first threshold ratio may be 80%, but is not limited thereto, and may be set according to actual applications.

It will be appreciated that the above rule for determining the main page type is only exemplary, and in other embodiments, other determination rules may be used.

According to some embodiments, the analyzing the layout structure of the text lines based on the layout model may also include analyzing a layout structure of the text lines of the main layout type. According to some embodiments, before the layout structure of the text lines is analyzed based on the layout model, rectangular blocks corresponding to unimportant text in the image may be selectively discarded.

According to some embodiments, before the layout structure of the text lines of the main layout type is analyzed, rectangular blocks of a sub-layout type are selectively removed or not removed from the plurality of rectangular blocks, wherein the sub-layout type includes the other one selected from the group consisting of the horizontal layout type and the vertical layout type.

In some examples, text lines of a sub-layout type with a small area ratio may be considered as unimportant text. In such an embodiment, before the layout structure of the text lines of the main layout type is analyzed, the sub-layout type of the plurality of text lines may be determined based on the respective geometric parameters of the plurality of rectangular blocks. As described above, the main layout type may be one of the horizontal layout type and the vertical layout type (e.g., the horizontal layout type), and the sub-layout type may be the other one of the horizontal layout type and the vertical layout type (e.g., the vertical layout type). Then, the rectangular blocks of the sub-layout type are selectively removed or not removed from the plurality of rectangular blocks, so as to obtain the selected rectangular blocks. As used herein, the term "removing" may refer to modifying a data value of a data element of the layout model to a default value (e.g., zero). Discarding some unimportant text can avoid interrupting the reading order of text of the main layout to the greatest extent during text recognition and broadcasting, and improve the user experience.

Figure 23:
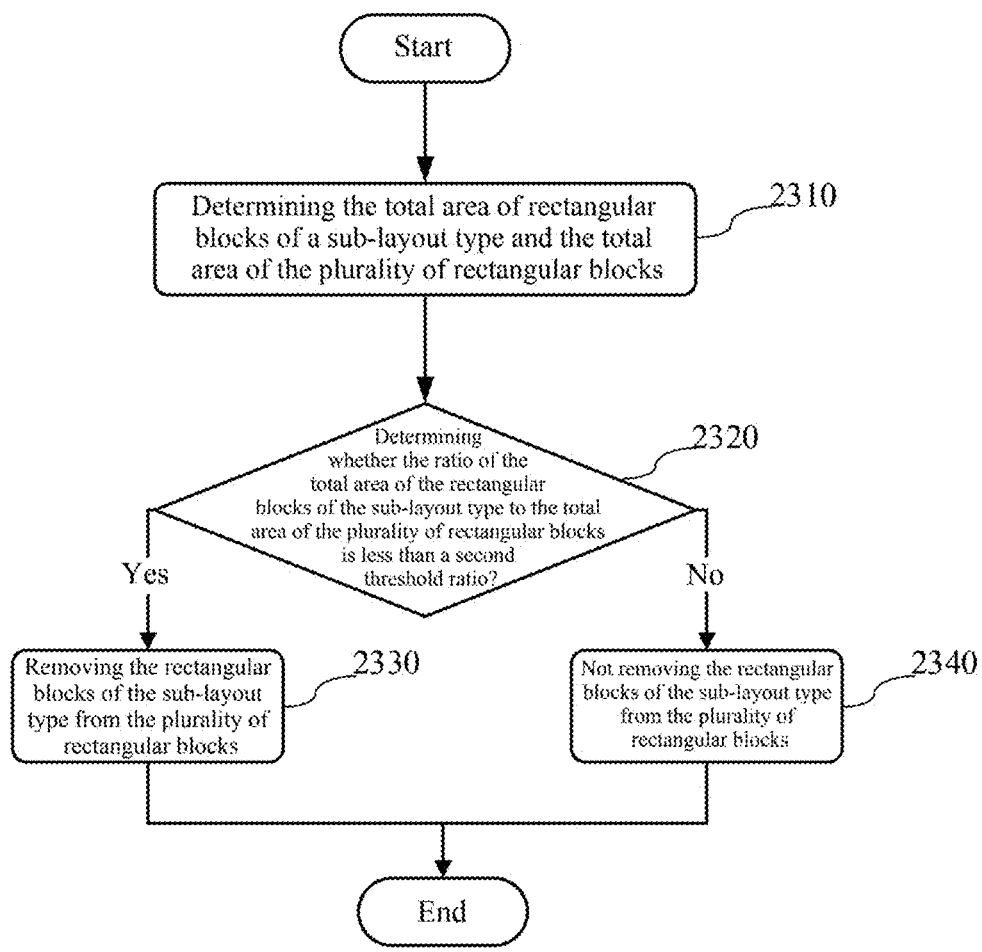
FIG. 23 is a flow chart showing an example process of selectively discarding sub-layout type text according to an exemplary embodiment.

FIG. 23 is a flow chart showing an example process of selectively discarding rectangular blocks corresponding to unimportant text in an image. As shown in FIG. 23, it can be determined whether to remove the rectangular blocks of the sub-layout type by calculating the ratio of the rectangular blocks of the sub-layout type to the total area of the plurality of rectangular blocks. First, in step 2310, the total area of the rectangular blocks of the sub-layout type and the total area of the plurality of rectangular blocks are determined, that is, the total area of the rectangular blocks of the sub-layout type and the total area of all the rectangular blocks in the layout model are determined. Then, in step 2320, it is determined whether the ratio of the total area of the rectangular blocks of the sub-layout type to the total area of the plurality of rectangular blocks is less than a second threshold ratio. If it is determined that the ratio of the total area of the rectangular blocks of the sub-layout type to the total area of the plurality of rectangular blocks is less than the second threshold ratio (step 2320, "Yes"), the rectangular blocks of the sub-layout type are removed from the plurality of rectangular blocks (step 2330). If it is determined that the ratio of the total area of the rectangular blocks of the sub-layout type to the total area of the plurality of rectangular blocks is not less than the second threshold ratio (step 2320, "No"), the rectangular blocks of the sub-layout type are not removed from the plurality of rectangular blocks (step 2340). According to some embodiments, the second threshold ratio may be set according to actual applications, e.g., 3%, 5%, or 7%. The present disclosure is not limited in this respect.

After this operation is performed, the step of analyzing the layout structure of the text lines of the main layout type is performed. The analysis method for the layout structure of the text lines of the main layout type is similar to the analysis method described above with respect to FIGS. 6 to 21, which will not be repeated herein for the sake of brevity.

According to some embodiments, after the layout structure of the text lines of the main layout type is analyzed, if the rectangular blocks of the sub-layout type are not removed from the plurality of rectangular blocks, the layout structure of the text lines of the sub-layout type can continue to be analyzed. The analysis method for the layout structure of the text lines of the sub-layout type is similar to the analysis method described above with respect to FIGS. 6 to 21, which will not be repeated herein for the sake of brevity.

The exemplary method for layout analysis according to the present disclosure has been described above with reference to the accompanying drawings. After the layout analysis, subsequent processing may also be performed. For example, the text data recognized text line by text line may be converted into sound data according to a result of text line arrangement in combination with a result of text recognition, which may be used, for example, in applications related to audio books and visual impaired assisting applications. In the case where the text lines of the image include both a horizontal layout and a vertical layout and text lines of the sub-layout type have not been removed during layout analysis, when the subsequent processing is performed to combine a text recognition result for text broadcasting, text in the text lines of the main layout type can be recognized and broadcast first, and after the text in the text lines of the main layout type has been broadcast, text in the text lines of the sub-layout type is recognized and broadcast.

Figure 24:
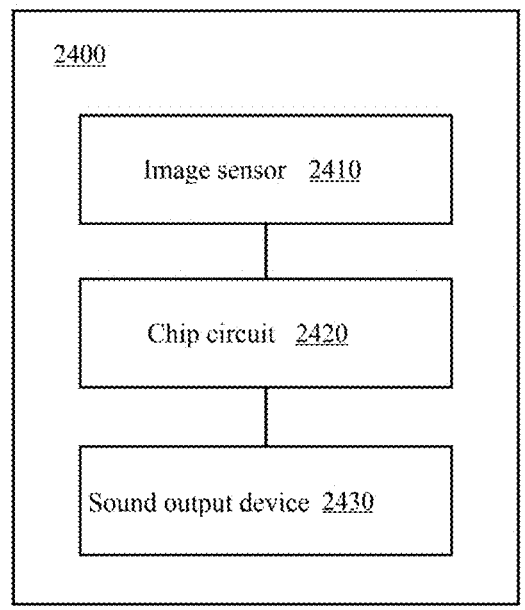
FIG. 24 is a structural block diagram showing a reading assisting device according to an exemplary embodiment.

FIG. 24 is a structural block diagram showing a reading assisting device according to an exemplary embodiment of the present disclosure. As shown in FIG. 24, the reading assisting device 2400 includes: an image sensor 2410 (which, for example, may be implemented as a webcam or camera) configured to acquire the foregoing image (the image may be, for example, a static image or a video image, and the image can contain text); and a chip circuit 2420 configured as a circuit unit that performs the steps according to any one of the foregoing methods.

As used herein, the term "circuit" may be part of or include the following circuits: an application-specific integrated circuit (ASIC), an electronic circuit, a processor (shared, dedicated, or group) and/or a memory (shared, dedicated, or group) that execute one or more software or firmware programs, a combinational logic circuit that provides the functions, and/or other suitable hardware components. In some embodiments, a circuit or functions associated with the circuit may be implemented by one or more software or firmware modules. In some embodiments, a circuit may include logic that is at least partially operable in hardware. The embodiments described herein may be implemented as a system using any properly configured hardware and/or software.

According to some embodiments, the chip circuit may further include a circuit unit configured to perform text recognition on the image to obtain text data, and a circuit unit configured to convert the text data in each text line into sound data according to a result of text line arrangement. The circuit unit configured to perform text recognition on the image to obtain text data may, for example, use any text recognition (e.g., optical character recognition (OCR)) software or circuit. The circuit unit configured to convert the text data in each text line into sound data according to a result of text line arrangement may, for example, use any text-to-speech conversion software or circuit. The circuit units may be implemented, for example, by an ASIC chip or an FPGA chip. The reading assisting device 2400 may further include a sound output device 2430 (e.g., a speaker, and a headphone) configured to output the sound data (i.e., speech data).

An aspect of the present disclosure may include an electronic device. The electronic device may include: a processor; and a memory storing a program, wherein the program includes instructions that, when executed by the processor, cause the processor to perform any of the foregoing methods. According to some embodiments, the program may further include an instruction to convert, when the instruction is executed by the processor, the text data in each text line into sound data according to a result of text line arrangement. According to some embodiments, the electronic device may be, for example, a reading assisting device. According to some embodiments, the electronic device may be another device (e.g., a mobile phone, a computer, and a server) in communication with the reading assisting device. In the case where the electronic device is another device in communication with the reading assisting device, the reading assisting device may send the photographed image to the another device for execution of any of the foregoing methods by the another device, and then returns a processing result (e.g., a layout analysis result, a text recognition result, and/or sound data converted from the text data) of the method back to the reading assisting device for execution of the subsequent processing (e.g., playing the sound data to a user) by the reading assisting device.

According to some embodiments, the reading assisting device may be implemented as a wearable device, for example, a device worn in the form of eyeglasses, a head-mounted device (such as a helmet or a hat), a device wearable on ears, accessories attached to eyeglasses (e.g., an eyeglass frame and eyeglass legs), accessories attached to the hat, etc.

By means of the reading assisting device, a visually impaired user can "read" conventional reading matter (such as books and magazines) with similar reading postures as a reader with normal vision. During the course of "reading", the reading assisting device automatically performs layout analysis on the captured layout image according to the methods in the foregoing embodiments to arrange the text lines, sequentially converts the text in the text lines into sound in an order of the text lines, and outputs the sound through an output apparatus, such as a speaker or a headphone, for the user to listen.

Figure 25:
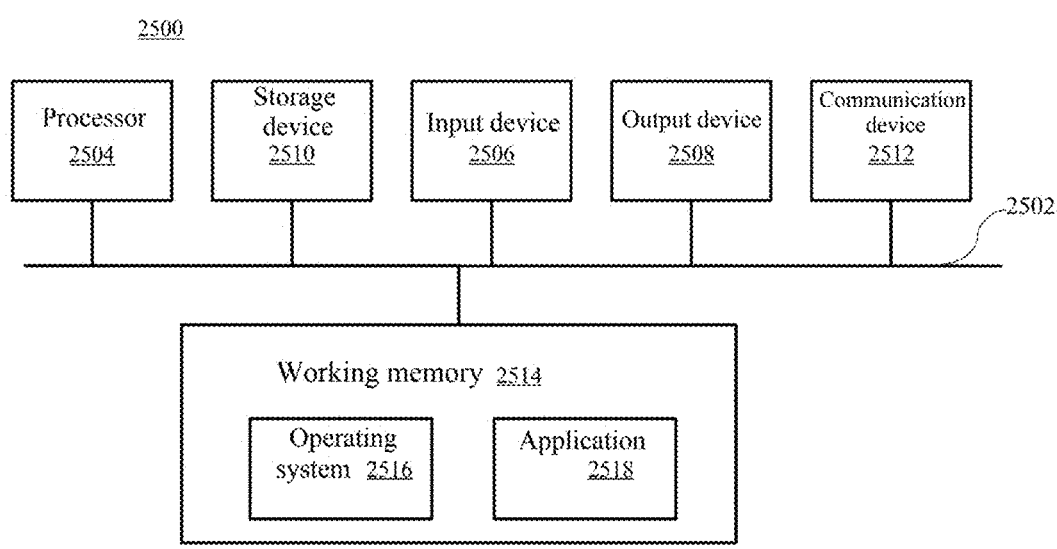
FIG. 25 is a structural block diagram showing an exemplary computing device that can be applied to an exemplary embodiment.

An aspect of the present disclosure may include a computer-readable storage medium storing a program, wherein the program includes instructions that, when executed by a processor of an electronic device, cause the electronic device to perform any of the foregoing methods. Referring to FIG. 25, the computing device 2500 is now described, which is an example of a hardware device that can be applied to various aspects of the present disclosure. The computing device 2500 may be any machine configured to perform processing and/or computing, which may be, but is not limited to, a workstation, a server, a desktop computer, a laptop computer, a tablet computer, a personal digital assistant, a smart phone, an on-board computer, a wearable device or any combination thereof. According to some embodiments, the reading assisting device or the electronic device may also be implemented, in whole or at least in part, by the computing device 2500 or a similar device or system.

The computing device 2500 may include elements in connection with a bus 2502 or in communication with a bus 2502 (possibly via one or more interfaces). For example, the computing device 2500 may include the bus 2502, one or more processors 2504 (which may be configured to implement the processor or chip circuit included in the foregoing reading assisting device), one or more input devices 2506, and one or more output devices 2508. The one or more processors 2504 may be any type of processors, and may include, but are not limited to, one or more general-purpose processors and/or one or more dedicated processors (e.g., special processing chips). The input device 2506 may be any type of device capable of inputting information to the computing device 2500, and may include, but is not limited to, a sensor (e.g., the sensor for acquiring an image as described above), a mouse, a keyboard, a touch screen, a microphone and/or a remote controller. The output device 2508 may be any type of device capable of presenting information, and may include, but is not limited to, a display, a speaker (e.g., the output device that may be configured to output the sound data as described above), a video/audio output terminal, a vibrator and/or a printer. The computing device 2500 may also include a storage device 2510 or be connected to the storage device 2510. The storage device (which may be, for example, configured to implement the computer-readable storage medium as described above) may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or code. The storage device 2510 can be removed from an interface. The storage device 2510 may have data/programs (including instructions)/code for implementing the foregoing methods and steps. The computing device 2500 may further include a communication device 2512. The communication device 2512 may be any type of device or system that enables communication with an external device and/or a network, and may include, but is not limited to, a modem, a network interface card, an infrared communication device, a wireless communication device and/or a chipset, e.g., a Bluetooth device, a 1302.11 device, a Wi-Fi device, a WiMax device, a cellular communication device and/or the like.

The computing device 2500 may also include a working memory 2514 (which may be used to implement the memory included in the foregoing reading assisting device), which may be any type of working memory capable of storing programs (including instructions) and/or data useful to the working of the processor 2504, and may include, but is not limited to, a random access memory and/or a read-only memory.

Software elements (programs) may be located in the working memory 2514, and may include, but is not limited to, an operating system 2516, one or more applications (i.e. application programs) 2518, drivers, and/or other data and code. The instructions for executing the methods and steps may be included in the one or more applications 2518. Executable code or source code of the instructions of the software elements (programs) may be stored in a non-transitory computer-readable storage medium (e.g., the storage device 2510), and may be stored in the working memory 2514 when executed (may be compiled and/or installed). The executable code or source code of the instructions of the software elements (programs) may also be downloaded from a remote location.

When the computing device 2500 shown in FIG. 25 is applied to an implementation of the present disclosure, the working memory 2514 may store program code for executing the flow chart of the present disclosure and/or an image to be recognized containing text content. The applications 2518 may include optical character recognition applications (such as Adobe), voice conversion applications, editable text processing applications, etc. that are provided by a third party. The input device 2506 may be a sensor for acquiring an image including text content. The stored image including text content or the acquired image may be processed by the OCR application into an output result including text. The output device 2508 is, for example, a speaker or a headphone for speech broadcast. The processor 2504 is configured to execute, according to the program code in the working memory 2514, the steps of the methods according to various aspects of the present disclosure.

It should further be appreciated that various variations may be made according to specific requirements. For example, custom hardware may also be used, and/or specific elements (i.e., the chip circuits) may be implemented in hardware, software, firmware, middleware, microcode, hardware description languages, or any combination thereof. For example, some or all of the disclosed methods and devices (e.g., the circuit units in the above chip circuit) may be implemented by programming hardware (e.g., a programmable logic circuit including a field programmable gate array (FPGA) and/or a programmable logic array (PLA)) in an assembly language or a hardware programming language (such as, VERILOG, VHDL, C++) by using the logic and algorithm of the present disclosure.

It should further be understood that the components of the computing device 2500 can be distributed over a network. For example, some processing may be executed by one processor while other processing may be executed by another processor away from the one processor. Other components of the computing device 2500 may also be similarly distributed. As such, the computing device 2500 may be interpreted as a distributed computing system that performs processing at a plurality of locations.

Although the embodiments or examples of the present disclosure have been described with reference to the drawings, it should be appreciated that the methods, systems, and devices described above are merely exemplary embodiments or examples, and the scope of the present invention is not limited by the embodiments or examples, but only defined by the granted claims and equivalent scopes thereof. Various elements in the embodiments or examples may be omitted or replaced by equivalent elements thereof. In addition, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A layout analysis method, comprising:
obtaining coordinate information of a plurality of text lines in an image;
creating a layout model of the image according to the coordinate information;
analyzing a layout structure of the text lines based on the layout model; and
determining an order of the text lines relative to each other based on the layout structure;
wherein the creating the layout model of the image according to the coordinate information comprises:
filling data elements corresponding to the coordinate information in a data structure with data values to obtain the layout model, wherein the data elements filled with the data values form a plurality of rectangular blocks, and the plurality of rectangular blocks correspond to respective text lines in the plurality of text lines,
wherein the analyzing the layout structure of the text lines based on the layout model comprises:
selectively adjusting widths of the plurality of rectangular blocks, so that the plurality of rectangular blocks are merged into a plurality of connected regions that are separate from each other; and
analyzing a spatial layout of the plurality of connected regions to obtain a layout structure of the text lines.

2. The method according to claim 1, wherein the selectively adjusting the widths of the plurality of rectangular blocks comprises:
for each rectangular block:
increasing a width of the rectangular block by a first amount in response to the width of rectangular block being less than or equal to a representative width of the plurality of rectangular blocks;
increasing the width of the rectangular block by a second amount in response to the width of the rectangular block being greater than the representative width and less than or equal to a first number of times of the representative width;
not adjusting the width of the rectangular block in response to the width of the rectangular block being greater than the first number of times of the representative width and less than or equal to a second number of times of the representative width; and
decreasing the width of the rectangular block by a third amount in response to the width of the rectangular block being greater than the second number of times of the representative width.

3. The method according to claim 1, wherein the analyzing the spatial layout of the plurality of connected regions comprises:
selectively correcting or not correcting orientations of the plurality of connected regions in the layout model;
selectively removing or not removing connected regions in the layout model that are directly adjacent to any one of two sides of the layout model in a line direction, to obtain respective selected connected regions; and
performing projection segmentation on the respective selected connected regions to obtain a set of segmented zones and an order of the segmented zones relative to each other.

4. The method according to claim 3, wherein the selectively correcting or not correcting orientations of the plurality of connected regions in the layout model comprises:
determining whether the plurality of connected regions are in an inclined state with respect to any one of the line direction and a column direction of the layout model; and
rotating the plurality of connected regions by a correction angle in response to determining that the plurality of connected regions are in the inclined state, so that the plurality of connected regions are not in the inclined state.

5. The method according to claim 4, wherein the selectively removing or not removing connected regions in the layout model that are directly adjacent to any one of two sides of the layout model in the line direction comprises:

performing vertical projection segmentation on the layout model in response to the plurality of connected regions being not in the inclined state; and depending on a result of the vertical projection segmentation, selectively removing or not removing, from the plurality of connected regions, connected regions that are directly adjacent to any one of two sides of the layout model in the line direction.

6. The method according to claim 5, wherein the selectively removing or not removing, from the plurality of connected regions, connected regions that are directly adjacent to any one of two sides of the layout model in the line direction comprises:

not performing the removal in response to determining that at least two zones have not been obtained from the layout model through the vertical projection segmentation; and in response to determining that at least two zones have been obtained from the layout model through the vertical projection segmentation, determining corresponding effective sizes of the at least two zones in the line direction, and performing following operations on each side zone of the at least two zones that is directly adjacent to any one of two sides of the layout model in the line direction:

removing connected regions in the side zone in response to two zones having been obtained from the layout model through segmentation and an effective size of the side zone in the line direction being less than a first threshold percentage of a largest size in the corresponding effective sizes and less than a second threshold percentage of an effective size of the other of the two zones in the line direction; and removing connected regions in the side zone in response to more than two zones having been obtained from the layout model through segmentation and the effective size of the side zone in the line direction being less than a third threshold percentage of the largest size in the corresponding effective sizes and less than a fourth threshold percentage of an effective size of a zone in the zones that is directly adjacent to the side zone in the line direction.

7. The method according to claim 3, wherein the performing projection segmentation on the respective selected connected regions comprises:

recursively and alternately performing horizontal projection segmentation and vertical projection segmentation on the respective selected connected regions, to obtain the set of segmented zones from the layout model through segmentation; and determining an order of respective segmented zones in the set of segmented zones relative to each other based on a reading order rule.

8. The method according to claim 7, wherein the recursively and alternately performing horizontal projection segmentation and vertical projection segmentation on the respective selected connected regions comprises:

performing operations cyclically, the operations comprising:

performing vertical projection segmentation on each horizontal segmented zone obtained through horizontal projection segmentation; and performing horizontal projection segmentation on each vertical segmented zone obtained through vertical projection segmentation, until each segmented zone cannot be segmented through horizontal projection segmentation and vertical projection segmentation, wherein the segmented zones that cannot be segmented through horizontal projection segmentation and vertical projection segmentation form the set of segmented zones.

9. The method according to claim 8, wherein the performing vertical projection segmentation on each horizontal segmented zone obtained through horizontal projection segmentation comprises:

searching the horizontal segmented zone for a set of data columns, wherein a sum of data values of each data column in the set of data columns is in a range from zero to a first threshold, and the first threshold is greater than zero;

selecting, from the set of data columns, a vertical dividing line for segmenting the horizontal segmented zone in response to finding the set of data columns; and segmenting the horizontal segmented zone using the selected vertical dividing line to obtain a vertical segmented zone.

10. The method according to claim 8, wherein the performing horizontal projection segmentation on each vertical segmented zone obtained through vertical projection segmentation comprises:

searching the vertical segmented zone for a set of data lines, wherein a sum of data values of each data line in the set of data lines is in a range from zero to a second threshold, and the second threshold is greater than zero;

selecting, from the set of data lines, a horizontal dividing line for segmenting the vertical segmented zone in response to finding the set of data lines; and segmenting the vertical segmented zone using the selected horizontal dividing line to obtain a horizontal segmented zone.

11. The method according to claim 8, wherein the determining the order of the respective segmented zones in the set of segmented zones relative to each other comprises:

recording, in performing the operations cyclically, hierarchical relationships between horizontal segmented zones, between vertical segmented zones, and between the horizontal segmented zones and the vertical segmented zones in a hierarchy tree data structure, wherein leaf nodes in the hierarchy tree data structure represent the set of segmented zones; and traversing the leaf nodes according to the reading order rule, wherein an order of traversing the leaf nodes represents an order of the respective segmented zones in the set of segmented zones relative to each other.

12. The method according to claim 4, wherein the analyzing the spatial layout of the plurality of connected regions further comprises, after the performing projection segmentation on the respective selected connected regions:

determining whether the respective selected connected regions have ever been rotated by the correction angle; and reversely rotating the set of segmented zones by the correction angle in response to determining that the respective selected connected regions have ever been rotated by the correction angle.

13. The method according to claim 12, wherein the determining the order of the text lines relative to each other based on the layout structure comprises:

determining, according to relative positions of the respective selected connected regions with respect to respective segmented zones in the set of segmented zones, a correspondence between the respective selected connected regions and the respective segmented zones, wherein each segmented zone contains a corresponding set of selected connected regions;

arranging selected connected regions in the corresponding set of selected connected regions according to a positional relationship between the selected connected regions in the corresponding set of selected connected regions;

arranging rectangular blocks in each selected connected region according to a positional relationship between the rectangular blocks in the selected connected region; and matching the plurality of text lines with rectangular blocks in the respective selected connected regions according to a correspondence between the plurality of text lines and the plurality of rectangular blocks.

14. The method according to claim 1, further comprising, before the analyzing the layout structure of the text lines based on the layout model:

recognizing a main layout type of the plurality of text lines, wherein the main layout type comprises one selected from a group consisting of a horizontal layout type and a vertical layout type.

15. The method according to claim 14, wherein the analyzing the layout structure of the text lines based on the layout model comprises:

analyzing a layout structure of the text lines of the main layout type.

16. The method according to claim 15, further comprising, before the analyzing the layout structure of the text lines of the main layout type:

selectively removing or not removing rectangular blocks of a sub-layout type from the plurality of rectangular blocks, wherein the sub-layout type comprises the other one selected from the group consisting of the horizontal layout type and the vertical layout type.

17. An electronic device, comprising:

a processor; and a memory storing a program, wherein the program comprises instructions that, when executed by the processor, cause the processor to perform following operations:

obtaining coordinate information of a plurality of text lines in an image;

creating a layout model of the image according to the coordinate information;

analyzing a layout structure of the text lines based on the layout model; and determining an order of the text lines relative to each other based on the layout structure;

wherein the creating the layout model of the image according to the coordinate information comprises:

filling data elements corresponding to the coordinate information in a data structure with data values to obtain the layout model, wherein the data elements filled with the data values form a plurality of rectangular blocks, and the plurality of rectangular blocks correspond to respective text lines in the plurality of text lines, wherein the analyzing the layout structure of the text lines based on the layout model comprises:

selectively adjusting widths of the plurality of rectangular blocks, so that the plurality of rectangular blocks are merged into a plurality of connected regions that are separate from each other; and analyzing a spatial layout of the plurality of connected regions to obtain a layout structure of the text lines.

18. A non-transitory computer-readable storage medium storing a program, wherein the program comprises instructions that, when executed by a processor of an electronic device, cause the electronic device to perform following operations:

obtaining coordinate information of a plurality of text lines in an image;

creating a layout model of the image according to the coordinate information;

analyzing a layout structure of the text lines based on the layout model; and determining an order of the text lines relative to each other based on the layout structure;

wherein the creating the layout model of the image according to the coordinate information comprises:

filling data elements corresponding to the coordinate information in a data structure with data values to obtain the layout model, wherein the data elements filled with the data values form a plurality of rectangular blocks, and the plurality of rectangular blocks correspond to respective text lines in the plurality of text lines, wherein the analyzing the layout structure of the text lines based on the layout model comprises:

selectively adjusting widths of the plurality of rectangular blocks, so that the plurality of rectangular blocks are merged into a plurality of connected regions that are separate from each other; and analyzing a spatial layout of the plurality of connected regions to obtain a layout structure of the text lines.

* * * * *